United States Patent
Khandani

(10) Patent No.: US 11,012,144 B2
(45) Date of Patent: May 18, 2021

(54) SYSTEM AND METHODS FOR IN-BAND RELAYING

(71) Applicant: Amir Keyvan Khandani, Kitchener (CA)

(72) Inventor: Amir Keyvan Khandani, Kitchener (CA)

(73) Assignee: Amir Keyvan Khandani

( * ) Notice: Subject to any disclaimer, the term of this patent is extended or adjusted under 35 U.S.C. 154(b) by 0 days.

(21) Appl. No.: 16/248,676

(22) Filed: Jan. 15, 2019

(65) Prior Publication Data

US 2019/0222296 A1 Jul. 18, 2019

Related U.S. Application Data

(60) Provisional application No. 62/617,952, filed on Jan. 16, 2018.

(51) Int. Cl.
*H04B 7/155* (2006.01)
*H04L 5/14* (2006.01)
(Continued)

(52) U.S. Cl.
CPC ........... *H04B 7/15557* (2013.01); *H04B 1/44* (2013.01); *H04B 7/00* (2013.01); *H04B 7/1555* (2013.01);
(Continued)

(58) Field of Classification Search
CPC .. H04B 7/15557; H04B 7/00; H04B 7/15585; H04B 7/1555; H04B 1/44; H04B 7/086;
(Continued)

(56) References Cited

U.S. PATENT DOCUMENTS 2,995,752 A 8/1961 Shyhalla
3,082,421 A 3/1963 Nicholas
(Continued)

FOREIGN PATENT DOCUMENTS

EP 2180623 4/2010
GB 1091437 11/1967
(Continued)

OTHER PUBLICATIONS

Chen, B., et al., "Quantization Index Modulation: A Class of Provably Good Methods for Digital Watermarking and Information Embedding", IEEE Transaction on information Theory, vol. 47, No. 4, May 2001, pp. 1423-1443. (21 pages).
(Continued)

*Primary Examiner* — Vinncelas Louis
(74) *Attorney, Agent, or Firm* — Invention Mine LLC

(57) ABSTRACT

A method and system is disclosed for operating an in-band relay to receive and amplify an incoming radio frequency signal and forward the amplified radio frequency signal. Methods to improve isolation between receive and transmit front-ends are disclosed, enabling an increase in the amplification gain without causing oscillation. Methods for learning the impulse response of the self-interference channel, and methods to perform adaptive echo cancellation in the analog domain. In addition, methods for transmit and receive beamforming are presented that achieve two objectives: (1) Improve the signal-to-noise ratio of the relayed signal, thereby compensating for noise amplification. (2) Improve the isolation, thereby enabling to increase the relay gain without causing oscillation.

16 Claims, 23 Drawing Sheets

(51) Int. Cl.
 *H04B 1/44* (2006.01)
 *H04B 7/00* (2006.01)
(52) U.S. Cl.
 CPC ....... *H04B 7/15585* (2013.01); *H04L 5/1461* (2013.01)
(58) Field of Classification Search
 CPC .... H04B 7/0617; H04L 5/1461; H01Q 1/007; H04M 9/082; H03G 7/007
 See application file for complete search history.

(56) References Cited

U.S. PATENT DOCUMENTS

| | | | |
|---|---|---|---|
| 3,184,747 A | 5/1965 | Kach | |
| 3,725,920 A | 4/1973 | Kupfer | |
| 3,965,475 A | 6/1976 | Deerkoski | |
| 4,112,430 A | 9/1978 | Ladstatter | |
| 4,268,727 A | 5/1981 | Agrawal | |
| 4,343,005 A | 8/1982 | Han | |
| 4,701,935 A | 10/1987 | Namiki | |
| 4,750,165 A | 6/1988 | Champagne | |
| 5,383,224 A | 1/1995 | Mizoguchi | |
| 5,388,124 A | 2/1995 | Laroia | |
| 5,596,439 A | 1/1997 | Dankberg et al. | |
| 5,630,154 A | 5/1997 | Bolstad et al. | |
| 5,691,978 A | 11/1997 | Kenworthy | |
| 5,805,116 A | 9/1998 | Morley | |
| 6,034,638 A | 3/2000 | Thiel et al. | |
| 6,084,919 A | 7/2000 | Kleider et al. | |
| 6,255,997 B1 | 7/2001 | Ratkorn | |
| 6,281,988 B1 | 8/2001 | Leung | |
| 6,317,092 B1 | 11/2001 | De Schweinitz | |
| 6,369,758 B1 | 4/2002 | Zhang | |
| 6,608,864 B1 | 8/2003 | Strait | |
| 6,621,876 B2 | 9/2003 | Camp, Jr. | |
| 6,731,908 B2 | 5/2004 | Berliner | |
| 6,745,009 B2 | 6/2004 | Raghothaman | |
| 6,781,991 B1 | 8/2004 | Anderlind | |
| 6,864,852 B2 | 3/2005 | Chiang et al. | |
| 6,870,515 B2 | 3/2005 | Kitchener | |
| 6,917,597 B1 | 7/2005 | Schmidl | |
| 6,934,511 B1 * | 8/2005 | Lovinggood | H01Q 1/007 343/702 |
| 7,002,518 B2 | 2/2006 | Lin | |
| 7,065,036 B1 | 6/2006 | Ryan | |
| 7,091,894 B2 | 8/2006 | Fudge | |
| 7,096,042 B2 | 8/2006 | Marinier | |
| 7,184,466 B1 | 2/2007 | Seemann | |
| 7,187,907 B2 | 3/2007 | Widrow | |
| 7,221,688 B2 | 5/2007 | Vanness | |
| 7,263,143 B1 | 8/2007 | Rothaar | |
| 7,272,366 B2 | 9/2007 | Haapoja | |
| 7,286,096 B2 | 10/2007 | Jaffer | |
| 7,321,611 B2 | 1/2008 | Fullerton | |
| 7,346,100 B2 | 3/2008 | Kumar | |
| 7,471,204 B2 | 12/2008 | Safarian | |
| 7,482,058 B2 | 1/2009 | Ahmed | |
| 7,522,115 B2 | 4/2009 | Waltman | |
| 7,627,325 B2 | 12/2009 | McCoy | |
| 7,693,174 B2 | 4/2010 | Ishibashi | |
| 7,706,744 B2 | 4/2010 | Rodgers | |
| 7,817,641 B1 | 10/2010 | Khandani | |
| 7,920,539 B2 | 4/2011 | Stanford | |
| 7,944,871 B2 | 5/2011 | Imamura | |
| 7,991,160 B2 | 8/2011 | Guccione | |
| 8,023,438 B2 | 9/2011 | Kangasmaa | |
| 8,031,744 B2 | 10/2011 | Radunovic | |
| 8,064,502 B2 | 11/2011 | Sawai | |
| 8,107,906 B2 | 1/2012 | Lum | |
| 8,175,535 B2 | 5/2012 | Mu | |
| 8,184,052 B1 | 5/2012 | Wu et al. | |
| 8,184,061 B2 | 5/2012 | Sanford | |
| 8,208,628 B2 | 6/2012 | Yener | |
| 8,238,551 B2 | 8/2012 | Reznik | |
| 8,280,046 B2 | 10/2012 | Rudolf | |
| 8,306,480 B2 | 11/2012 | Muhammad | |
| 8,351,874 B2 | 1/2013 | Dent | |
| 8,373,582 B2 | 2/2013 | Hoffberg | |
| 8,385,235 B2 | 2/2013 | Chiu | |
| 8,401,196 B2 | 3/2013 | Goldberg | |
| 8,405,543 B2 | 3/2013 | Kluge | |
| 8,423,986 B1 | 4/2013 | Grechanik | |
| 8,498,585 B2 | 7/2013 | Vandenameele | |
| 8,520,855 B1 | 8/2013 | Kohno et al. | |
| 8,587,492 B2 | 11/2013 | Runyon | |
| 8,628,650 B2 | 1/2014 | Ah | |
| 8,629,650 B2 | 1/2014 | Mohammadian | |
| 8,644,768 B2 | 2/2014 | Kluge | |
| 8,744,377 B2 | 6/2014 | Rimini | |
| 8,767,869 B2 | 7/2014 | Rimini | |
| 8,823,577 B2 | 9/2014 | Smid | |
| 8,836,581 B2 | 9/2014 | Nysen | |
| 8,836,601 B2 | 9/2014 | Sanford | |
| 8,836,606 B2 | 9/2014 | Kish | |
| 8,837,615 B2 | 9/2014 | Baldemair | |
| 8,842,044 B2 | 9/2014 | Nysen | |
| 8,860,629 B2 | 10/2014 | Shtrom | |
| 8,897,269 B2 | 11/2014 | Ji | |
| 8,918,692 B2 | 12/2014 | Braithwaite | |
| 8,976,641 B2 | 3/2015 | Choi | |
| 9,019,165 B2 | 4/2015 | Shtrom | |
| 9,036,749 B2 | 5/2015 | Choi | |
| 9,054,795 B2 | 6/2015 | Choi | |
| 9,059,879 B2 | 6/2015 | Jaeger | |
| 9,071,313 B2 | 6/2015 | Monsen | |
| 9,077,071 B2 | 7/2015 | Shtrom | |
| 9,077,407 B2 | 7/2015 | Koren | |
| 9,077,421 B1 | 7/2015 | Mehlman | |
| 9,093,758 B2 | 7/2015 | Kish | |
| 9,130,693 B2 | 9/2015 | Reznik | |
| 9,246,234 B2 | 1/2016 | Rao | |
| 9,276,682 B2 | 3/2016 | Bharadia | |
| 9,277,591 B2 | 3/2016 | Amini | |
| 9,281,979 B2 | 3/2016 | Maltsev | |
| 9,337,885 B2 | 5/2016 | Mehlman | |
| 9,571,205 B1 | 2/2017 | Suarez | |
| 9,608,705 B2 | 3/2017 | Maru | |
| 9,622,098 B2 | 4/2017 | Emmanuel | |
| 9,713,010 B2 | 7/2017 | Khandani | |
| 9,791,552 B1 | 10/2017 | Schuman | |
| 10,067,746 B1 | 9/2018 | Yu | |
| 10,068,228 B1 | 9/2018 | Winklevoss et al. | |
| 10,069,479 B1 | 9/2018 | Desclos | |
| 2001/0010495 A1 | 8/2001 | Helms | |
| 2001/0024434 A1 | 9/2001 | Ayyagari et al. | |
| 2002/0028655 A1 | 3/2002 | Rosener et al. | |
| 2002/0032004 A1 | 3/2002 | Widrow | |
| 2002/0097810 A1 | 7/2002 | Seki | |
| 2003/0043071 A1 | 3/2003 | Lilly et al. | |
| 2003/0114128 A1 | 6/2003 | Haapoja | |
| 2003/0189974 A1 | 10/2003 | Ferry | |
| 2003/0189975 A1 | 10/2003 | Fullerton | |
| 2003/0206579 A1 * | 11/2003 | Bryant | H03G 7/007 375/219 |
| 2004/0022229 A1 | 2/2004 | Vanness | |
| 2004/0027304 A1 | 2/2004 | Chiang et al. | |
| 2004/0076246 A1 | 4/2004 | Vanderperren et al. | |
| 2004/0132414 A1 | 7/2004 | Sendyk | |
| 2005/0020771 A1 | 1/2005 | Ahmed | |
| 2005/0024540 A1 | 2/2005 | Kim et al. | |
| 2005/0052330 A1 | 3/2005 | Mehltretter | |
| 2005/0057420 A1 | 3/2005 | Lin | |
| 2005/0083863 A1 | 4/2005 | Umei | |
| 2005/0129223 A1 * | 6/2005 | Piket | H04M 9/082 379/406.01 |
| 2005/0275576 A1 | 12/2005 | Fudge | |
| 2006/0014491 A1 | 1/2006 | Cleveland | |
| 2006/0045063 A1 | 3/2006 | Stanford | |
| 2006/0109067 A1 | 5/2006 | Shtrom | |
| 2006/0192720 A1 | 8/2006 | Shtrom | |
| 2007/0026804 A1 | 2/2007 | Ishibashi | |
| 2007/0026807 A1 | 2/2007 | Kish | |
| 2007/0036353 A1 | 2/2007 | Reznik | |
| 2007/0057860 A1 | 3/2007 | Jaffer | |

(56) References Cited

U.S. PATENT DOCUMENTS

| | | |
|---|---|---|
| 2007/0063875 A1 | 3/2007 | Hoffberg |
| 2007/0070902 A1 | 3/2007 | Elaoud et al. |
| 2007/0080891 A1 | 4/2007 | De Lustrac |
| 2007/0082617 A1 | 4/2007 | McCallister |
| 2007/0082622 A1 | 4/2007 | Leinonen et al. |
| 2007/0118749 A1 | 5/2007 | Hagn et al. |
| 2007/0132651 A1 | 6/2007 | Nilsson |
| 2007/0189528 A1 | 8/2007 | Ueda |
| 2007/0254692 A1 | 11/2007 | McCoy |
| 2008/0009257 A1 | 1/2008 | Safarian |
| 2008/0063113 A1 | 3/2008 | Gao |
| 2008/0107046 A1 | 5/2008 | Kangasmaa |
| 2008/0123851 A1 | 5/2008 | Guccione |
| 2008/0129640 A1 | 6/2008 | Shtrom |
| 2008/0165874 A1 | 7/2008 | Steele et al. |
| 2008/0233966 A1 | 9/2008 | Scheim |
| 2008/0294970 A1 | 11/2008 | Gross et al. |
| 2009/0092072 A1 | 4/2009 | Imamura |
| 2009/0100313 A1 | 4/2009 | Gross et al. |
| 2009/0135748 A1 | 5/2009 | Lindoff et al. |
| 2009/0141900 A1 | 6/2009 | Ye |
| 2009/0186582 A1 | 7/2009 | Muhammad |
| 2009/0190558 A1 | 7/2009 | Strutt et al. |
| 2009/0213770 A1 | 8/2009 | Mu |
| 2009/0253385 A1 | 10/2009 | Dent |
| 2009/0284218 A1 | 11/2009 | Mohammadian |
| 2009/0323582 A1 | 12/2009 | Proctor et al. |
| 2010/0003931 A1 | 1/2010 | Krishnan |
| 2010/0008406 A1 | 1/2010 | Sawai |
| 2010/0020771 A1 | 1/2010 | Ji |
| 2010/0022201 A1 | 1/2010 | Vandenameele |
| 2010/0086012 A1 | 4/2010 | Rofougaran |
| 2010/0165866 A1 | 7/2010 | Sachse |
| 2010/0165895 A1 | 7/2010 | Elahi |
| 2010/0167662 A1 | 7/2010 | Kluge |
| 2010/0232324 A1 | 9/2010 | Radunovic |
| 2010/0248714 A1 | 9/2010 | Kang |
| 2010/0271987 A1 | 10/2010 | Chiu |
| 2010/0321245 A1 | 12/2010 | Aoki |
| 2011/0080325 A1 | 4/2011 | Livneh et al. |
| 2011/0110451 A1 | 5/2011 | Tsai |
| 2011/0116639 A1 | 5/2011 | Yamada et al. |
| 2011/0143655 A1 | 6/2011 | Ahn |
| 2011/0149714 A1 | 6/2011 | Rimini |
| 2011/0268100 A1 | 11/2011 | Gorokhov |
| 2012/0027113 A1 | 2/2012 | Gaal |
| 2012/0068904 A1 | 3/2012 | Shtrom |
| 2012/0087424 A1 | 4/2012 | Brown |
| 2012/0113862 A1 | 5/2012 | Santhanam et al. |
| 2012/0159279 A1 | 6/2012 | Braithwaite |
| 2012/0200158 A1 | 8/2012 | Takei |
| 2012/0201153 A1 | 8/2012 | Bharadia |
| 2012/0201173 A1 | 8/2012 | Jain |
| 2012/0220246 A1 | 8/2012 | Kushnir |
| 2012/0281834 A1 | 11/2012 | Reznik |
| 2012/0300680 A1 | 11/2012 | Pietsch |
| 2012/0327881 A1 | 12/2012 | Nakano et al. |
| 2013/0010851 A1 | 1/2013 | Jaeger |
| 2013/0044791 A1 | 2/2013 | Rimini |
| 2013/0089009 A1 | 4/2013 | Li |
| 2013/0089021 A1 | 4/2013 | Gaal et al. |
| 2013/0099974 A1 | 4/2013 | Wang |
| 2013/0102254 A1 | 4/2013 | Cyzs |
| 2013/0114468 A1 | 5/2013 | Hui |
| 2013/0286903 A1 | 10/2013 | Khojastepour |
| 2013/0301487 A1 | 11/2013 | Khandani |
| 2014/0006797 A1 | 1/2014 | Cordella et al. |
| 2014/0126675 A1 | 5/2014 | Monsen |
| 2014/0135056 A1 | 5/2014 | Wang |
| 2014/0157367 A1 | 6/2014 | Zhang |
| 2014/0169236 A1 | 6/2014 | Choi |
| 2014/0204808 A1 | 7/2014 | Choi |
| 2014/0210681 A1 | 7/2014 | Shtrom |
| 2014/0218248 A1 | 8/2014 | Schulz |
| 2014/0219139 A1 | 8/2014 | Choi |
| 2014/0225788 A1 | 8/2014 | Schulz |
| 2014/0269964 A1 | 9/2014 | Du et al. |
| 2014/0331061 A1 | 11/2014 | Wright et al. |
| 2014/0333466 A1 | 11/2014 | Mohamadi |
| 2014/0334322 A1 | 11/2014 | Shtrom |
| 2014/0348018 A1 | 11/2014 | Bharadia et al. |
| 2014/0348032 A1 | 11/2014 | Hua |
| 2014/0363008 A1* | 12/2014 | Chen ................ H04M 9/082 381/66 |
| 2015/0029906 A1 | 1/2015 | Jana |
| 2015/0043323 A1 | 2/2015 | Choi |
| 2015/0043685 A1 | 2/2015 | Choi |
| 2015/0049834 A1 | 2/2015 | Choi |
| 2015/0063176 A1 | 3/2015 | Hong |
| 2015/0070243 A1 | 3/2015 | Kish |
| 2015/0078217 A1 | 3/2015 | Choi |
| 2015/0085830 A1 | 3/2015 | Nozaki et al. |
| 2015/0139284 A1 | 5/2015 | Choi |
| 2015/0171903 A1 | 6/2015 | Mehlman |
| 2015/0188646 A1 | 7/2015 | Bharadia |
| 2015/0223173 A1 | 8/2015 | Khojastepour |
| 2015/0236750 A1 | 8/2015 | Choi |
| 2015/0249997 A1 | 9/2015 | Clegg |
| 2015/0261973 A1 | 9/2015 | Ohare et al. |
| 2015/0263780 A1 | 9/2015 | Mehlman |
| 2015/0280893 A1 | 10/2015 | Choi |
| 2015/0311599 A1 | 10/2015 | Shtrom |
| 2015/0312905 A1 | 10/2015 | Seo et al. |
| 2015/0318976 A1 | 11/2015 | Eltawil |
| 2015/0333847 A1 | 11/2015 | Bharadia |
| 2015/0334745 A1 | 11/2015 | Zhao |
| 2015/0341125 A1 | 11/2015 | Bharadia |
| 2015/0341879 A1 | 11/2015 | Shtrom |
| 2016/0127876 A1 | 5/2016 | Kish |
| 2016/0226653 A1 | 8/2016 | Bharadia |
| 2016/0248160 A1 | 8/2016 | Shtrom |
| 2016/0249376 A1 | 8/2016 | Kish |
| 2016/0283937 A1 | 9/2016 | Reese et al. |
| 2017/0161635 A1 | 6/2017 | Oono et al. |
| 2018/0075347 A1 | 3/2018 | Alistarh et al. |
| 2018/0288019 A1 | 10/2018 | Dinia et al. |
| 2018/0373978 A1 | 12/2018 | Yu et al. |

FOREIGN PATENT DOCUMENTS

| | | |
|---|---|---|
| JP | 10502220 A | 2/1998 |
| KR | 1020040096404 | 11/2004 |
| KR | 1020070072629 | 7/2007 |
| KR | 1020120080231 | 7/2012 |
| WO | 1994028585 | 12/1994 |
| WO | 1996022643 | 7/1996 |
| WO | 2011065020 | 6/2002 |
| WO | 2003098823 | 11/2003 |
| WO | 2004007497 | 1/2004 |
| WO | WO2009156510 | 12/2009 |
| WO | 2010005951 | 1/2010 |
| WO | 2010051232 | 5/2010 |
| WO | 2011148341 | 12/2011 |
| WO | 2012042256 | 4/2012 |
| WO | 2016014016 | 1/2016 |

OTHER PUBLICATIONS

EP Extended European Search Report for EP App. No. 13790076.7, dated Mar. 2, 2016, 8 pages.
EP Extended Search Report for EP App. No., 13790160.9-1874, dated Jan. 16, 2016, 9 pages.
Extended European Search Report for EP App. 13790948.7, dated Nov. 4, 2015, 9 pages.
Gharavol, E., et al., "Robust joint Optimization of MIMO Two-Way Relay Channels With Imperfect CSI", Communication; Control, and Computing (Allerton); 2011 49th Annual Allerton Conference on, IEEE, Sep. 28, 2011, pp. 1657-1664 (6 pages), XP032085749, DOI: 0.1109/Allerton.2011.6120368, ISBN: 978-1-4577-1817-5.
International Search Report and Written Opinion for PCT/US2013/040822 dated Jul. 18, 2013. (8 pages).
International Search Report and Written Opinion for PCT/US2014/042136 dated Dec. 9, 2014. (13 pages).

(56) References Cited

OTHER PUBLICATIONS

International Search Report and Written Opinion for PCT/US2014/051137 dated Nov. 24, 2014. (10 pages).
International Search Report and Written Opinion from PCT/US2014/050968 dated Nov. 19, 2014. (9 pages).
International Search Report for PCT/US2013/040818 dated Jul. 24, 2013. (2 pages).
Jain, M., "Practical, Real-Time, Full Duplex Wireless", MobiCom '11, Sep. 19-23, 2011, Las Vegans, NC, USA, 2011 (12 pages).
Choi, Jung Il, et al., "Achieving single channel, full duplex wireless communication", Proceedings from the Annual International Conference on Mobile Computing and Networking, MOBICOM—MOBICOM' 10 and MOBIHOC' 10—Proceedings of the 16th Annual International Conference on Mobile Computing and Networking and 11th ACM International Symposi, Sep. 20, 2010, pp. 1-12 12 pages, XP002696691.
McMichael, J. G., et al., "Optimal tuning of analog self-interference cancellers for full-duplex wireless communication". IEEE, Fiftieth Annual Allerton Conference, Oct. 1-5, 2012, p. 246-251, (6 pages).
Persson, D., et al., "Joint Source-Channel Coding for the MIMO Broadcast Channel", IEEE Transactions on Signal Processing, vol. 60, No. 4, Apr. 2012, pp. 2085-2090, (6 pages).
Provisional Application, entitled: "Adaptive Non-Linear Digital Cancellation for Full-Duplex Radios", U.S. Appl. No. 61/864,453, filed Aug. 9, 2013. (27 pages).
Provisional Application, entitled: "Cancellation Circuit With Variable Delay and Amplifier", U.S. Appl. No. 61/876,663, filed Sep. 11, 2013. (20 pages).
Provisional Application, entitled: "Feed Foward Signal Cancellation", U.S. Appl. No. 61/736,726, filed Dec. 13, 2012. (17 pages).
Provisional Application, entitled: "Frequency Independent Analog Cancellation Circuit", U.S. Appl. No. 61/864,459, filed Aug. 9, 2013, (25 pages).
Provisional Application, entitled: "Hybrid IF/RF Digital Cancellation Architectures for Full-Duplex Radios", U.S. Appl. No. 61/915,431, filed Dec. 12, 2013. (31 pages).
Provisional Application, entitled: "Interference Cancellation Architectures With Frequency Isolation", U.S. Appl. No. 62/030,240, filed Jul. 29, 2014. (30 pages).
Provisional Application, entitled: "Method and Apparatus for Mitigating Phase Noise to Improve Self-Interference Cancellation", U.S. Appl. No. 61/865,943, filed Aug. 14, 2013.
Provisional Application, entitled: "Method and Apparatus for Mitigating Phase Noise to Improve Self-Interference Cancellation", U.S. Appl. No. 61/865,943, filed Aug. 14, 2013. (27 pages).
Provisional Application, entitled: "Near Band Cancellation", U.S. Appl. No. 61/970,852, filed Mar. 26, 2014. (28 pages).
Vaze, R., et al., "To Code or Not to Code in Multi-Hop Relay Channels", Arxiv.org, Cornell University Library, May 20, 2008, XP080418936, 30 pages.
Provisional Application, entitled: "Signal Cancellation Using Feedforward and Feedback", U.S. Appl. No. 61/760,518, filed Feb. 4, 2013. (19 pages).
Provisional Application, entitled: "Self Interference Cancellation Architecture for In-Band Full Duplex Relay Node", U.S. Appl. No. 61/871,519, filed Aug. 29, 2013. (30 pages).
Provisional Application, entitled: "Techniques for Digital Interference Cancellation", U.S. Appl. No. 62/002,578, filed May 23, 2014. (33 pages).
Provisional Application, entitled: "Tunable Self Interference Cancellation", U.S. Appl. No. 61/950,742, filed Mar. 10, 2014. (32 pages).
Provisional Application, entitled: "Tuning Algorithm for Multi-Tap Signal Cancellation Circuit", U.S. Appl. No. 61/754,447, filed Jan. 18, 2013. (16 pages).
Korean Patent Abstract of 1020070072629, dated Jul. 4, 2007, 1 page.
Extended European Search Report for EP App. 14865287.8, dated Jul. 4, 2017. 7 Pages.
Aono T et al: "Wireless secret key generation exploiting reactance-domain scalar response of muitipath fading channels", IEEE Transactions on Antennas and Propagation, IEEE Service Center, Piscataway, NJ, US, vol. 53, No. 11, Nov. 1, 2005 (Nov. 1, 2005), pp. 3776-3784 (9 pages), XP001512766; ISSN: 0016-926X, DOI: 10.1109/TAP.2005.858853.
Khandani Amir K: "Two-way (true full-duplex) wireless", 2013 13th Canadian Workshop on Information Theory, IEEE, Jun. 18, 2013 (Jun. 18, 2013), pp. 33-38 (6 pages), XP032495648, DOI: 10.1109/CWIT2013.6621588 , [retrieved on Oct. 4, 2013].
Ding, Cunsheng, et al., "A Generic Construction of Cartesian Authentication Codes", IEEE Transactions on Information Theory, vol. 53, No. 6, Jun. 2007, 2229-2235.

* cited by examiner

SYSTEM AND METHODS FOR IN-BAND RELAYING

CROSS-REFERENCE TO RELATED APPLICATIONS

This application claims the benefit of U.S. Provisional Patent Application No. 62/617,952 filed Jan. 16, 2018, entitled "NOISE-REDUCING IN-BAND RELAY", which is hereby incorporated herein by reference in its entirety.

BACKGROUND OF THE INVENTION

A communication link with capability to support connections in both transmit and receive directions at the same time and over the entire frequency band is called full-duplex, or two-way. In contrast, a link that can support connection in only one direction at a time (over a given frequency band) is called one-way or half-duplex. Current wireless systems are one-way and rely on either separate time slots (time division duplex) or separate frequency bands (frequency division duplex) to transmit and to receive. These alternatives have their pros and cons, but both suffer from lack of ability to transmit and to receive concurrently over entire frequency band. Relays are used to extend the range in wireless communications. Currently, wireless relays mainly rely on either time division duplex or frequency division duplex to separate the incoming and outgoing links. It is desirable to have amplify-and-forward relays that can amplify an incoming signal and simultaneously transmit it over the same band as an outgoing signal. Current amplify-and-forward relays suffer from two major shortcomings, namely noise amplification, and self-echo (self-interference) which results in oscillation, limiting the relay gain. To avoid oscillation, current amplify-and-forward relays rely on physical separation between their incoming and outgoing antennas to reduce self-echo, and thereby enabling to increase the amplification gain. Such a remedy based on physical distance limits the applicability of amplify-and-forward relays, and increases the cost. Therefore there is a need for innovation in the field of amplify-and-forward relays and related full-duplex transceivers.

SUMMARY

A method and system is disclosed for operating an in-band relay to receive and amplify an incoming radio frequency signal and forward the amplified radio frequency signal. Methods to improve isolation between receive and transmit front-ends are disclosed, enabling to increase the amplification gain without causing oscillation. Methods for learning the impulse response of the self-interference channel, and methods to perform adaptive echo cancellation in the analog domain. In addition, methods for transmit and receive beamforming are presented that achieve two objectives: (1) Improve the signal-to-noise ratio of the relayed signal, thereby compensating for noise amplification. (2) Improve the isolation, thereby enabling to increase the relay gain without causing oscillation.

A method according to one or more embodiments for amplify-and-forward relaying includes performing antenna beamforming to identify beamformer settings that provide an increased signal to noise ratio of a desired signal and also provides a self-interference channel at a level that avoids oscillation in the receive signal path; and reducing self-interference using an adaptive echo cancellation circuit in at least one tunable relay element, the adaptive echo cancellation circuit configured in accordance with a measured self-interference channel resulting in part from the performed antenna beamforming.

In one or more embodiments, the antenna beamforming includes organizing a plurality of antenna elements into a plurality of groups; performing beamforming in a first stage wherein the plurality of antenna elements within each of the plurality of groups are beamformed using a two-state beam-former capable of generating at least a phase shift of either zero degrees or a phase shift of 180 degrees; and performing beamforming in a second stage wherein a plurality of signals from the plurality of groups are beam-formed using a plurality of adaptive analog filters.

In one or more embodiments of the method, the performing beamforming in the first stage includes beamforming using a three-state beam-former capable of generating the phase shift of zero degrees, the phase shift of 180 degrees or a disconnect for each antenna element.

In one or more embodiments of the method, the plurality of adaptive analog filters includes a plurality of bandpass filters in a radio frequency or intermediate frequency domain, coupled to one or more low-pass filters in an analog base-band; and each of a plurality of bandwidths of the plurality of bandpass filters are adjusted to produce a plurality of tunable delay elements.

In one or more embodiments of the method for amplify-and-forward relaying further includes adding a low power spreading training signal to an outgoing relayed signal; extracting the added lower power spreading training signal at a receiver side of the at least one tunable relay element; and computing a plurality of beamforming values using the added lower power spreading training signal.

In one or more embodiments the low power spreading training signal is generated by switching a radio frequency carrier, and wherein the low power spreading training signal is directly added at a front-end of a radio frequency transmitter, and the low power spreading training signal is extracted via a correlator receiver at a radio frequency front-end receiver.

In one or more embodiments, the performing antenna beamforming includes training a first set of beam-forming circuitries while using a second set of beam-forming circuitries; and switching between the first set and the second set of beam-forming circuitries at predetermined times that do not disturb equalization of signals communicated to and from a distant transceiver.

In one or more embodiments, the low power spreading training signal includes a plurality of copies of a spreading signal used for training, each of the copies of the spreading signal being mutually delayed and weighted.

In one or more embodiments, the low power spreading training signal is used to determine an impulse response of a self-interference channel when the low power spreading training signal is added to the radio frequency signal by switching a carrier signal.

In one or more embodiments, the low power spreading training signal is directly added at to a radio frequency by switching a carrier signal and an impulse response of a self-interference channel is extracted using a RAKE receiver operating in an analog radio frequency domain prior to a down-conversion.

In one or more embodiments, the method further includes extracting an impulse response of the self-interference using a training signal that includes a plurality of copies of a spreading signal used in training, each of the plurality of copies of the spreading signal being mutually delayed and weighted to enable a composite training signal that pre-equalizes the self-interference based on time-reversal filtering.

In one or more embodiments, the method includes extracting an impulse response of the self-interference using a training signal that is directly added at a radio frequency front end by switching a carrier signal; adding the training signal and one or more delayed versions of the training signal corresponding to one or more signal paths of a self-interference channel; extracting the training signal at a receiver side of the tunable relay element by applying down-conversion and base-band processing; up-sampling the down-converted training signal to increase time resolution in extracting one or more delay values corresponding to the one or more signal paths in the self-interference channel; and applying a RAKE receiver at a base-band to detect the impulse response of the self-interference channel with a high time resolution.

In one or more embodiments, the echo cancellation circuit includes a first stage of echo cancellation at a radio frequency, the first stage of echo cancellation including one or more first stage delay elements required in adaptive filtering including a plurality of radio frequency bandpass filters coupled to a plurality of vector modulators configured to perform complex multiplication; a second stage of echo cancellation at an intermediate frequency wherein one or more second stage delay elements required in adaptive filtering comprise a plurality of bandpass filters coupled to a plurality of vector modulators configured to perform complex multiplication; and a third stage of echo cancellation at analog baseband wherein one or more third stage delay elements comprise a plurality of low-pass filters with selectable bandwidth and complex multiplications are performed by changing a phase of a radio frequency (RF) carrier.

In one or more embodiments, the echo cancellation circuit includes a first stage of echo cancellation at a radio frequency, the first stage of echo cancellation including one or more first stage delay elements required in adaptive filtering wherein the one or more first stage delay elements include a plurality of radio frequency bandpass filters and a plurality of vector modulators configured to perform complex multiplication; a second stage of echo cancellation at an intermediate frequency wherein one or more second stage delay elements required in adaptive filtering comprise a plurality of bandpass filters and a plurality of vector modulators configured to perform complex multiplication; and a third stage of echo cancellation at an analog baseband, the third stage of echo cancellation including one or more third stage delay elements comprising a plurality of low-pass filters with selectable bandwidths and adjustment of relative magnitudes and signs of a plurality of in-phase and quadrature components (I and Q) at analog baseband provide complex multiplications.

In one or more embodiments, the echo cancellation circuit includes a first stage of echo cancellation at a radio frequency, the first stage of echo cancellation including one or more first stage delay elements required in adaptive filtering wherein the one or more first stage delay elements include a plurality of radio frequency bandpass filters and a plurality of vector modulators configured to perform complex multiplication; and a second stage of echo cancellation an analog baseband, the second stage of echo cancellation including one or more second stage delay elements comprising a plurality of low-pass filters with selectable bandwidths and wherein complex multiplications are performed by changing a phase of a radio frequency carrier used in down-conversion with gain adjustments at analog baseband.

In one or more embodiments, the echo cancellation circuit includes a first stage of echo cancellation at a radio frequency, the first stage of echo cancellation including one or more first stage delay elements required in adaptive filtering wherein the one or more first stage delay elements include a plurality of radio frequency bandpass filters and a plurality of vector modulators configured to perform complex multiplication; and a second stage of echo cancellation an analog baseband, the second stage of echo cancellation including one or more second stage delay elements comprising a plurality of low-pass filters with selectable bandwidths and wherein complex multiplications are performed by adjusting relative magnitudes and signs of the in-phase and quadrature components (I and Q) at analog baseband.

In one or more embodiments, a system includes a processor and a non-transitory computer-readable medium storing instructions operative to perform antenna beamforming to identify beamformer settings that provide an increased signal to noise ratio of a desired signal and also provides a self-interference channel at a level that avoids oscillation in the receive signal path; and reduce self-interference using an adaptive echo cancellation circuit in at least one tunable relay element, the adaptive echo cancellation circuit configured in accordance with a measured self-interference channel resulting in part from the performed antenna beamforming.

In one or more embodiments, the system includes antenna beamforming circuitry with a plurality of antenna elements organized into a plurality of groups, the beamforming circuitry including in a first stage wherein the plurality of antenna elements within each of the plurality of groups are beamformed using a two-state beam-former capable of generating at least a phase shift of either zero degrees or a phase shift of 180 degrees; and the beamforming circuitry further including a second stage wherein a plurality of signals from the plurality of groups are beam-formed using a plurality of adaptive analog filters.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
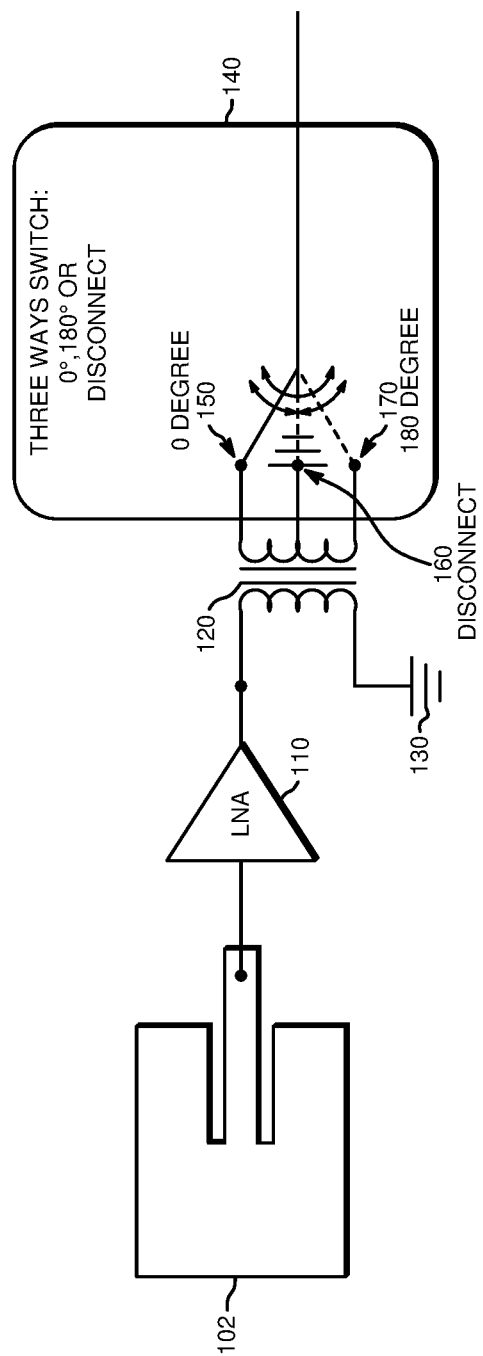
FIG. 1 illustrates a receive antenna element with a simple phase shifter of {0', 180', disconnect} for first stage receive beamforming in accordance with one or more embodiments.

A detailed description of illustrative embodiments will now be provided with reference to the various figures. Although this description provides detailed examples of possible implementations, it should be noted that the provided details are intended to be by way of example and in no way limit the scope of the application.

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

In the figures, antenna elements are shown as a patch. However, these could be replaced with other antenna structures, and be equipped with design mechanisms for multi-band operation. In a preferred embodiment, the dipole antennas are used for transmit (upon beamforming) and the patch antennas (upon combining) are used for receive.

The functionality of an amplify-and-forward relay, also called an in-band relay, is perhaps best explained by relying on an analogy. To play music throughout an area, one can install either a single powerful speaker in one location, or several small speakers throughout the area. Second option works better—it provides a uniform coverage. The first solution is analogous to using a single high-power cell-tower to provide wireless coverage in a large area. Similar to the case of playing music, using a high-power cell-tower will cause several problems; it will be unnecessarily loud in some locations (interference) and not loud enough in some other locations. Technologies such as "Distributed Antenna System (DAS)" and "Small Cell" have been developed to address these problems, i.e., provide a "uniform wireless coverage". The (full-duplex) amplify-and-forward (in-band) relay technology disclosed here provides an alternative solution with several advantages in terms of cost, complexity and performance.

Embodiments disclosed rely on a combination of antenna design and adaptive signal processing to realize an in-band relay with sufficient gain, while improving the end-to-end signal-to-noise-ratio through antenna beamforming. The improvement in the end-to-end signal-to-noise-ratio compensates for the noise amplification that is inherent in amplify-and-forward relaying. Methods for antenna beamforming are disclosed that achieve a combination of two objectives: (1) Reducing the coupling between transmit and receive units through creating and controlling antenna nulls between transmit and receive front-ends within the same relay unit (transmit null and/or receive null), thereby allowing to increase the relay gain without causing oscillation. (2) Improving link quality (i.e., improving the effective signal-to-noise-ratio, or the effective signal-to-interference-plus-noise-ratio) through focusing the transmitted signal on the distant receiver (transmit beamforming) and/or coherently combining signals received over multiple receiver antennas (receive beamforming). The disclosed beamforming techniques (for improving isolation) are accompanied with, and thereby enhanced by, symmetrical placement of the antennas to reduce the coupling between transmit and receive front-ends.

In some embodiments, antenna beamforming is enhanced by using adaptive filters for: (1) pre-equalization of the self-interference channel at the transmit side, and (2) equalization of the self-interference channel at the receive side. To keep the delay in the relaying operation at an acceptable level, adaptive filters are implemented in the analog domain, while relying on digital signal processing to compute and adapt the filter structure. Delay elements required in filter structures are realized using analog bandpass or analog low-pass filters. Complex multiplications required in filter structurers are realized using vector modulators, or by changing the phase of the carrier used in the down-conversion and/or in the up-conversion. In some embodiments, adaptive filtering further includes tunable delay elements, which are realized at the base-band or low IF (Intermediate Frequency) using low pass filtering (by changing the bandwidth of a low pass filter). In another embodiment, delay is tuned at RF/IF by selecting one among several transmission lines of different lengths, or by changing the bandwidth of a bandpass filter.

In some embodiments, complexity of antenna beamforming is reduced by relying on grouping the antenna elements and using two stages for beamforming: A first stage of inter-group beamforming in which a large number antenna elements within a group are combined using two-states phase shifting circuitries capable of generating {0',180' } phase shifts, or three-states phase shifting circuitries capable of generating {0',180', disconnect}.

A second stage of intra-group beamforming is then applied to the outcome of the first stage, wherein the signals obtained from different groups are combined by applying complex relative gains, or by passing through adaptive filters (for pre-equalization at the transmit side and/or equalization at the receive side). Although the words equalization and pre-equalization are used in the description of this disclosure, here the roles of the corresponding operations differ from their common use cases. In their common use cases, equalization/pre-equalization are used to compensate/pre-compensate the effect of the communication channel impulse response in establishing reliable communication between two distant points. In the context of embodiments herein, equalization/pre-equalization are used to compensate/pre-compensate the effect of the impulse response corresponding to self-interference channel (channel from transmit unit to receive unit within the same relay structure) to help in reducing echo.

Adaptive filters are also used in an echo cancellation loop which samples the outgoing signal, constructs a corrective signal from the sampled signal through adaptive filtering, and injects the corrective signal in the receive path to cancel out the remaining self-interference. Echo cancellation loop has a nested structure operating in the RF (Radio Frequency), IF (Intermediate Frequency) and analog BB (Base-Band). Methods in one or more embodiments typically rely on a combination of echo cancellation in different bands (RF, IF and BB) as each of these bands offer their own distinct advantages. Working in the RF domain for the purpose of echo cancellation simplifies the task of complex multiplication. Working in the IF domain for the purpose of echo cancellation facilitates incorporating multiple carrier frequencies in a single unit for multi-band operation. Thus, multiple carrier frequencies are down-converted to the same IF band and adaptive filtering is performed on the IF signal.

Working in the analog baseband (BB) domain (for the purpose of echo cancellation) simplifies the task of implementing tunable delay elements, by using a filter bank composed of multiple filters with different (tunable) bandwidths. The bandwidth of the filter is inversely related to the filter's delay. To realize longer delay values, multiple such filters (or filter banks) are cascaded.

The main objectives in antenna design are:

1—Reduce the coupling between transmit and receive chains. To achieve this goal, in one embodiment, different antennas (or antenna sets) are used for transmit and receive. Most pictorial views are provided to show such a configuration. In all cases, an antenna specified for the task of transmit can also receive, and an antenna that is specified for the task of receive can also transmit. In particular, a single antenna can be equipped with multiple terminals to perform the tasks of transmit, receive and signal combining for the cancellation of self-interference.

2—Through receive beamforming, antennas improve the signal to noise ratio of an incoming signal from a distant transmitter.

3—Through transmit beamforming, antennas improve the end-to-end signal to noise ratio of an outgoing signal upon reception at a distant receiver.

4—Through receive and/or transmit beamforming, antenna sets reduce the coupling from the transmit chain to the receive chain within the same full-duplex unit.

In various methods of one or more embodiments, transmit and receive antennas are symmetrically placed to reduce self-interference. In addition, through signal processing (echo cancellation), the coupling from transmit chain to receive chain within the same unit is further reduced. As a third factor, to reduce self-interference, antenna beamforming is used wherein, in addition to conventional role of beamforming in improving signal-to-noise-ratio, the antenna beamforming aims to create a transmit null over the receive antennas (transmit beamforming) and/or to create a receive null with respect to the transmit antennas of the same unit (receive beamforming).

One or more embodiments disclose three form factors to include the antennas and their associated circuitries. One form factor is in the form of a box wherein antenna elements are installed on the two walls of this box. Such a form factor is typically placed near a window, such that one side of the box faces outside to communicate with an external basestation. The other side of the box faces inside the room to provide wireless coverage inside the building. This form factor is referred to as a "Boxed Antenna" hereafter. Another form factor is in the form of a frame that will be typically hung on a wall. The frame can be the walls inside a building, or the exterior wall of a building. This form factor can be also installed similar to the case of installing traffic signs on the sides of a road. A third form factor is in the form of a tower with multiple sides, for example a hexagonal tower. Antennas are installed on the sides of the tower and tower stands on its own base. This form factor enables temporary installation because the unit will be moveable. In some embodiments, by using a solar energy panel, and rechargeable batteries, the unit is turned into a completely moveable unit for temporary installation in locations that access to power outlet is difficult.

In an embodiment, the frame (second form factor) serves a two-fold purpose.

Purpose 1: The interior of the frame serves the purpose of holding the antenna structure and its associated circuitries.

Purpose 2: On its exterior, the frame serves a second purpose, such as holding a canvas picture and thereby the entire structure plays a second role as a framed picture (for decorative purposes). The framed picture can include a shadow of light provided by small light bulbs installed in a compartment on the side(s) and/or bottom/top of the framed picture. In another embodiment, in installing the frame on a wall, it covers a power outlet, and in turn, it provides an outlet on its side or bottom part to replace the outlet that has been covered. The outlet interior to the box will be used to power the circuitries. The interior outlet also provides electricity to the exterior outlet. This form factor is referred to as a "Framed Antenna" hereafter. Other examples for the use of the frame's exterior are: including traffic signs, advertisement and/or directions to nearby businesses such as hotels/restaurants, e.g., located at nearby highway exists, facilitating the use of the framed antenna along the streets and/or highways.

The antenna structures have a symmetrical structure that reduces the coupling between transmit and receive chains. The signals from the multiple antennas are combined through complex gains, or through selecting a phase value for each antenna prior to combining. The first option can be implemented using a vector modulator, and the second option can be implemented by a circuitry that can provide a discrete set of phase values, and then the best phase among the available options is selected and applied to each antenna prior to RF signal combining.

In various embodiments, one or several antennas are used for receive and one or several antennas are used for transmit. Set of antennas used for transmission constitute a beamforming antenna set, wherein the goal of beamforming is two-fold: (1) Reduce the self-interference by creating a null on the receiving antennas within the same unit. (2) Focus the transmitted energy on the receiver antenna(s) of a distant transceiver of interest (e.g., an external base-station in communications with the beamforming relay unit). Similarly, set of antennas used for reception constitutes a beamforming antenna set, wherein the goal of beamforming is two-fold: (1) Reduce the self-interference by creating a null on (cancelling out) the signal coming from the transmitting antennas in the same unit. (2) Increase received energy (improve signal-to-noise ratio) in receiving signal from the transmitting unit of a distant transceiver of interest (e.g., an external base-station in communications with the beamforming relay unit).

Beamforming is achieved using one or a combination of the following methods:

(1) A complex gain factor, e.g., implemented using a vector modulator.

(2) A phase shifting unit with analog or digital inputs for adjusting relative phase values (to realize beamforming based on equal gains).

(3) A phase shifting unit with two phase values, wherein the two phase values are 180' out of phase. This is equivalent to selecting the sign of the corresponding complex signal to be either +1 or −1, whichever results in achieving a better outcome for the beamforming antenna set. In one or more embodiments, methods use a transformer (Balun) with center tapped secondary to create the 0,180' difference and a switching mechanism to select one of these two options.

(4) A phase shifting unit with two phase values, plus disconnect wherein the two phase values are 180' out of phase (this is equivalent to selecting the sign of the corresponding complex signal to be either +1 or −1, whichever results in achieving a better outcome for the beamforming antenna set). Embodiments herein disclose using a transformer (Balun) with center tapped secondary to create the 0,180' difference and a switching mechanism to select one of these three options (see FIG. 1).

FIG. 1 shows a preferred embodiment for providing two values for the phase that are 180' different, as well as the option of removing the antenna from the set involved in beamforming.

More particularly, FIG. 1 illustrates a patch antenna 102 coupled to a low noise amplifier 110 which is coupled to a Balun transformer 120 that is coupled to ground 130. The Balan 120 provides a switch 140 that enables 0 degree 150, disconnect 160 and 180 degree 170 options for switching.

One or more embodiments disclose a sequential greedy search mechanism to find the sign value for each antenna in the beamforming set. A metric is a quantity used to decide for the beamforming, for example, the metric could be the receive signal-to-noise ratio, or a combination of receive signal-to-noise ratio and energy of the leaked signal (self-interference). The sequential greedy search algorithm is explained next in the context of receive beamforming:

(Step 1): Order the antennas based on their initial metric value.

(Step 2) Compute the initial value of the metric, and start with all sign values equal to +1.

(Step 3) Starting from the first antenna, flip the sign of antennas one by one and keep the flipped sign if it results in improving the metric. In the case of a beam-former supporting three options of 0', 180' and disconnect (see FIG. 1), this step includes testing the disconnect option, plus flipping the sign, and selecting the best in terms of the metric.

(Step 4) Repeat step 3 for certain number of rounds, typically up to 3 rounds, sweeping through antennas and readjusting the corresponding sign values (and "disconnect", if the option is available) to improve the metric. Other search algorithms may be used to find local maxima, such as starting at two or more random or pseudo random configurations (by setting the antenna control inputs, or signs) and altering the settings to find a local maximum at each starting location. Then, portions of the settings may be combined in a type of "genetic" splicing of the antenna input settings and then a new search may be performed to find a local maximum.

Transmit beamforming will be similar, with a metric that measures the level of self-interference, and/or the ability to focus the transmitted energy on a distant (external) transceiver. The former objective will rely on locally measuring the level of the self-interference, and the latter objective will rely on closed loop measurements with the assistance of the distant transceiver.

Figure 2:
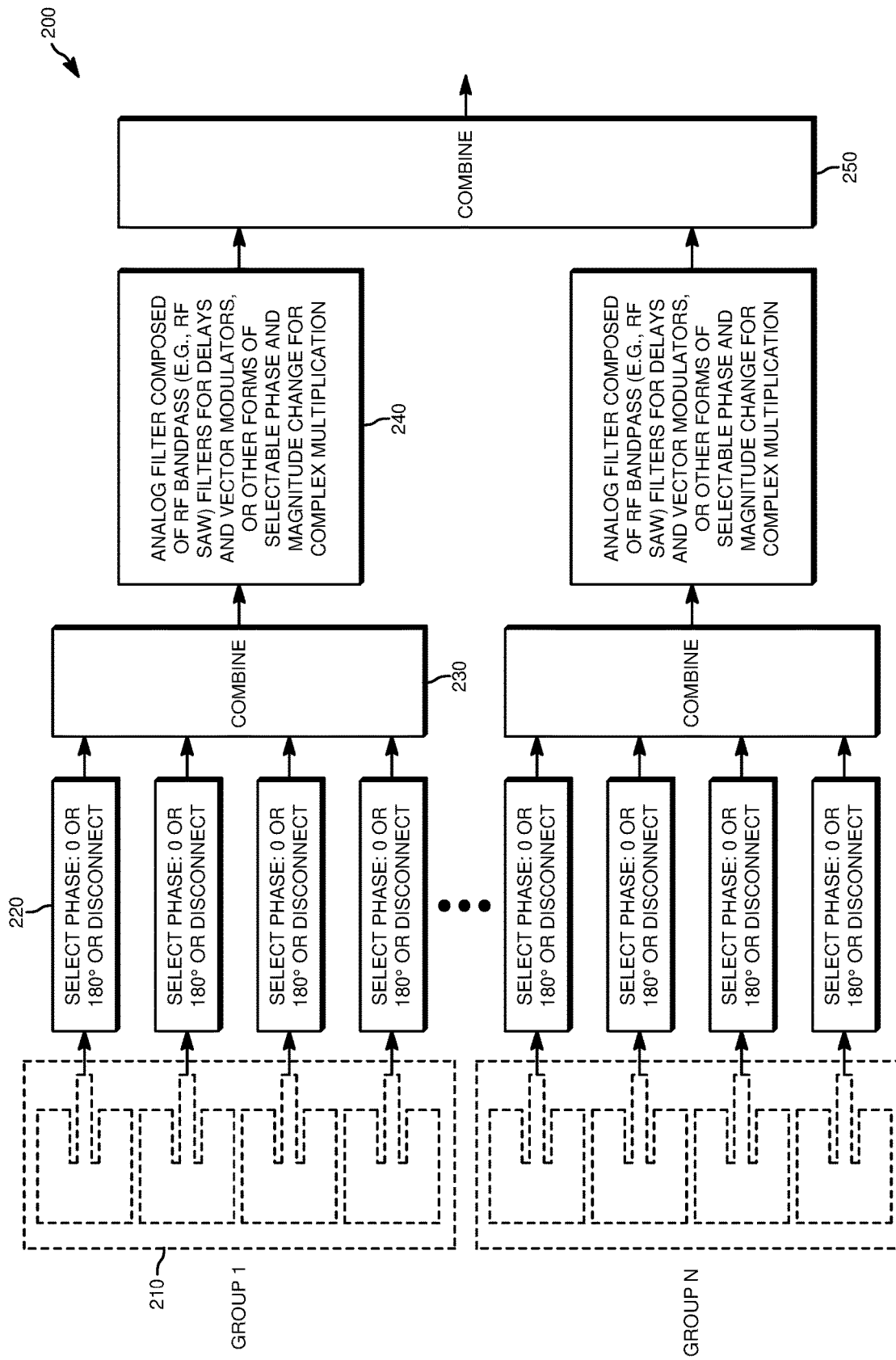
FIG. 2 illustrates a receive antenna element with two stages of receive beamforming in accordance with one or more embodiments.

Referring now to FIG. 2 an embodiment of circuitry 200 for combining the RF signals from different antenna elements is shown. Specifically, the structure of the disclosed two-stage beamforming is illustrated in the context of receive beamforming.

As shown a plurality of groups of patch antennas 210 are each coupled to select phase circuitry 220, followed by combine circuits 230, the output of the combiners are provided to an analog filter 240, which can be composed of RF bandpass filters, such as SAW filters for delays and Vector modulators, or other forms of selectable phase and magnitude change for complex multiplication. The output of the analog filters is provided to combiner 250 and output. In other words, in a first stage of beamforming, signals from antenna elements within a group are combined. This first stage typically relies on simple circuitries for phase selection, in particular, it relies on the configuration depicted in FIG. 1 providing three options for selection among {0',180', disconnect}. Then, in a second stage of beamforming, the signals from different groups of antenna elements are combined using adaptive analog filtering, wherein delay elements required in the realization of adaptive filters are realized using bandpass filters. In one embodiment, each receive antenna element will be cascaded with a Low Noise Amplifier (LNA).

Figure 3:
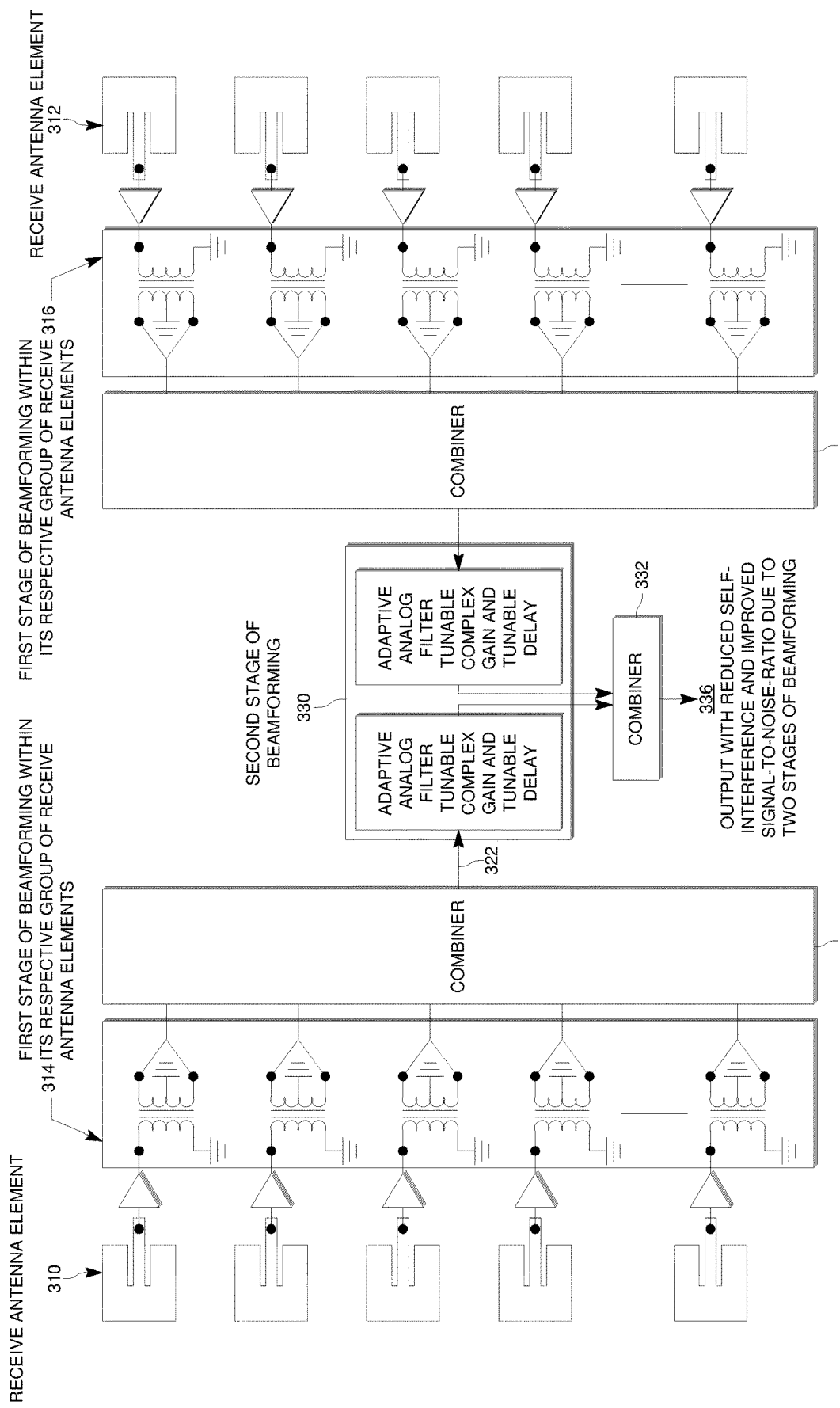
FIG. 3 illustrates another example for two stages of receive beamforming in accordance with one or more embodiments.

FIG. 3 provides another preferred example for combining the RF signals from different antenna elements. In a first stage of beamforming, signals from antenna elements within a group are combined. This first stage relies on phase shift values of {0',180'} for each antenna element. Similar to the embodiment in FIG. 2, the second stage of beamforming in the embodiment of FIG. 3 relies on more advanced adaptive analog filtering, wherein delay elements required in realization of adaptive filters are realized using bandpass filters.

As shown, a receive antenna element 310 is coupled to switches 314 which is a first stage of beamforming within its respective group of receive antenna elements, and coupled to combiner 320. The combiner is coupled to a second stage of beamforming 330 that provides for adaptive analog filter tunable complex gain and tunable delay. Second stage of beamforming also receives signals from similar first stage of beamforming shown by patch antennas 312, first stage of beamforming elements 316 and combiner 322. The FIG. 2 structure of two-stage beamforming can be used in transmit beamforming. In both cases of receive and transmit beamforming, the objectives are to adjust the beam-formers to: (1) reduce self-interference, and (2) improve Signal to Noise Ratio (SNR), or Signal to Interference plus Noise Ratio (SINR).

FIGS. 2 and 3 both depict two pictorial views of such a two-stage beamforming mechanism. Such a two-stage beamforming enables to select {0', disconnect, 180' } (FIG. 2) or {0', 180'} (FIG. 3) in the first stage of beamforming, and an adaptive analog filter (composed of delay elements and complex multiplications) in the second stage.

With a two-stage beamforming, at least one embodiment includes techniques wherein the {0', disconnect, 180'} (FIG. 2) or {0', 180'} (FIG. 3) in the first stage of beamforming are sequentially selected (based on the sequential greedy algorithm or other suitable algorithm as explained earlier) to maximize their respective signals received from the distant transceiver, and then the complex phase values (plus "tunable delay elements", if the option is available) involved in the second stage of beamforming are selected to minimize the self-interference and/or further improve the level of the signal received from the distant transceiver.

To improve the possibility of reducing the amount of self-interference through second stage of beamforming, at least one embodiment discloses methods using intertwined or interleaved grouping of antenna elements into subsets.

Figure 4:
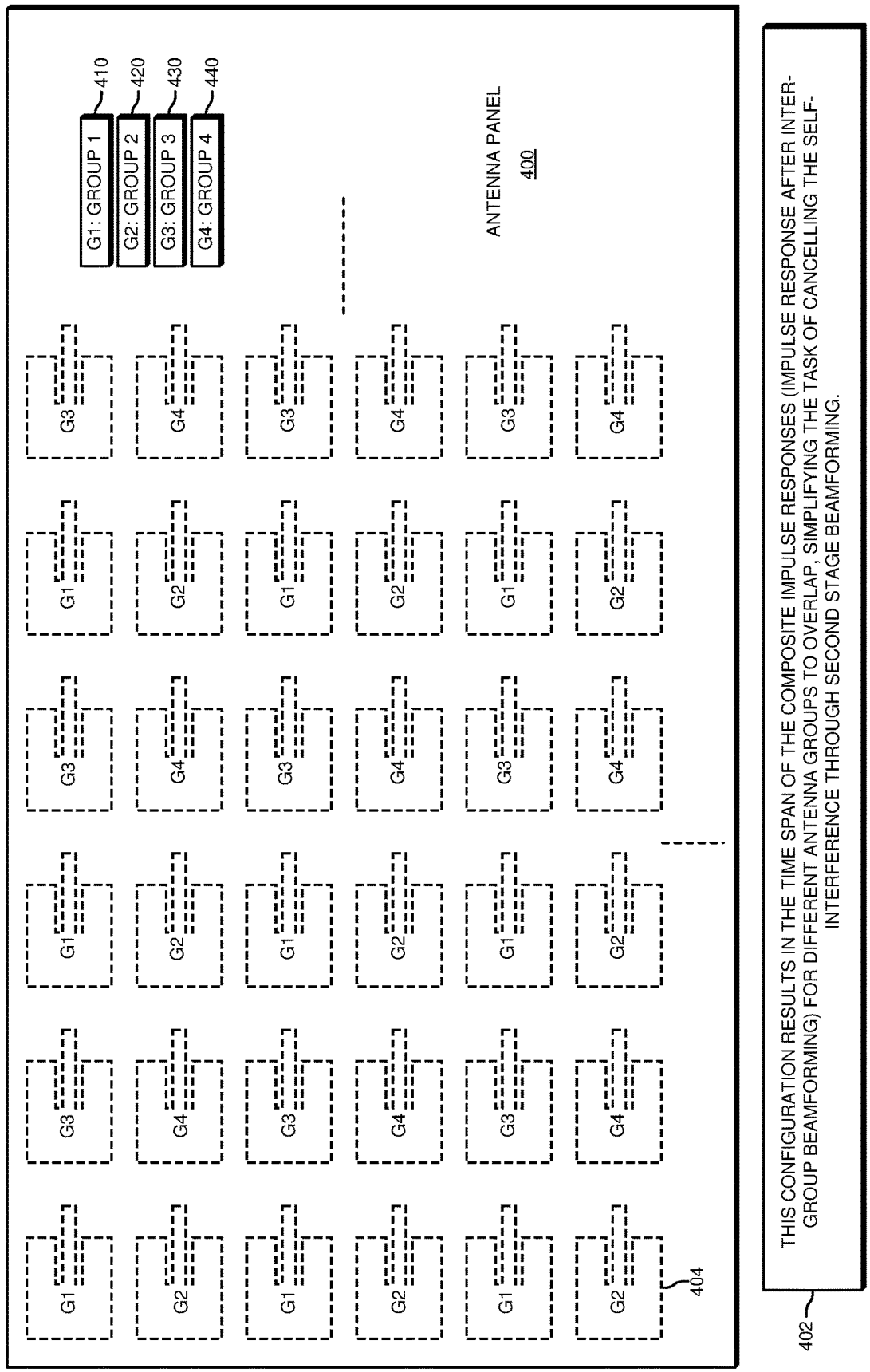
FIG. 4 illustrates an example for intertwined placement and grouping of antenna elements in forming two stages of receive beamforming in accordance with one or more embodiments.

Referring now to FIG. 4, an antenna panel 400 illustrates an embodiment for intertwined placement of different groups of antenna elements. As shown, four groups of patch antennas are illustrated in a configuration 402 that results in the time span of the composite impulse responses after inter-group beamforming for different antenna groups to overlap, simplifying the task of cancelling the self-interference through second stage beamforming. As shown group 1 410, group 2 420, group 3 430 and group 4 440 are organized to enable overlap. In an embodiment, the signals from different groups are combined to reduce the self-interference and/or to improve the signal coming from a distant transmitter. In canceling self-interference, it would be beneficial if the impulse responses from the transmit antenna to different antenna groups (after combining the signals of the antennas within each group) overlap in time. Intertwined or interleaved grouping in FIG. 4 helps to realize this feature. In the embodiment shown, each row of elements comprises two interleaved groups of elements, and each successive row uses two different groups. That is, a first row includes interleaved elements from group 1 and group 2, and then next row includes interleaved elements from group 3 and group 4. Other interleaved patterns may be used, and other combinations of groups may be used. In a first stage of beamforming, antennas within each group are combined using circuitry of FIG. 1, and then, in a second stage of beamforming, the signals from different groups are combined through adaptive analog filters. In one or more embodiments, the beamforming within each group is achieved to maximize the level of signal received from a distant transmitter, while the combining of groups' signals is performed to reduce self-interference. In a preferred embodiment, the search for the combining of groups' signals is performed according to two objectives: (1) Reduce the self-interference to a level that would allow the full-duplex unit to operate without oscillation. (2) Among possibilities that satisfy the first criterion, select the beamforming complex weights (complex gains) to increase the level of the signal arriving from the distant transmitter. In this case, if the beamforming of the groups' signals turns out to be insufficient to reduce the self-interference to the required level, then the beamforming within the groups {0,180' }, or {0', disconnect, 180'} would be also used to partially fulfill the objective of reducing the self-interference, and partially to improve the level of the signal coming from the distant transmitter. Once again, the beamforming structure is explained in the context of receive beamforming, and a similar construction is used in transmit beamforming. The objectives in transmit beamforming are: (1) reducing the self-interference by creating a transmit null on the receive antennas within the same unit, and (2) focusing the transmitted signal on a distant receiver for best reception. In addition to relative placement of antennas, an embodiment for receive antennas includes a tunable delay element in the path of the combined signal from each antenna group prior to the second stage of beamforming. In one or more embodiments the implementation of such a tunable delay element relies on using delay lines of different lengths selectable through switches. In another embodiment, band-pass filters, for example RF (Radio Frequency) SAW (Surface Acoustic Wave) filters, are used to act as a delay element. Larger delay elements are formed by cascading several such RF SAW filters, or by using a SAW filter of a smaller bandwidth.

FIG. 4 depicts an example of such an embodiment. Such an intertwined grouping of antenna elements into subsets helps to keep the time spread of the impulse responses from the transmit antenna(s) to each subset of receiver antenna elements (after the first stage of receive beamforming within each subset, i.e., inter-group beamforming), to overlap. Such an overlap facilitates cancelling the self-interference through the second stage of receive beamforming, i.e., intra-group beamforming. Here, the technique of two-stage beamforming and antenna grouping have been explained in the context of receive antennas. It is clear that a similar concept can be applied to transmit beamforming, or to both transmit and receive beamforming.

Figure 5:
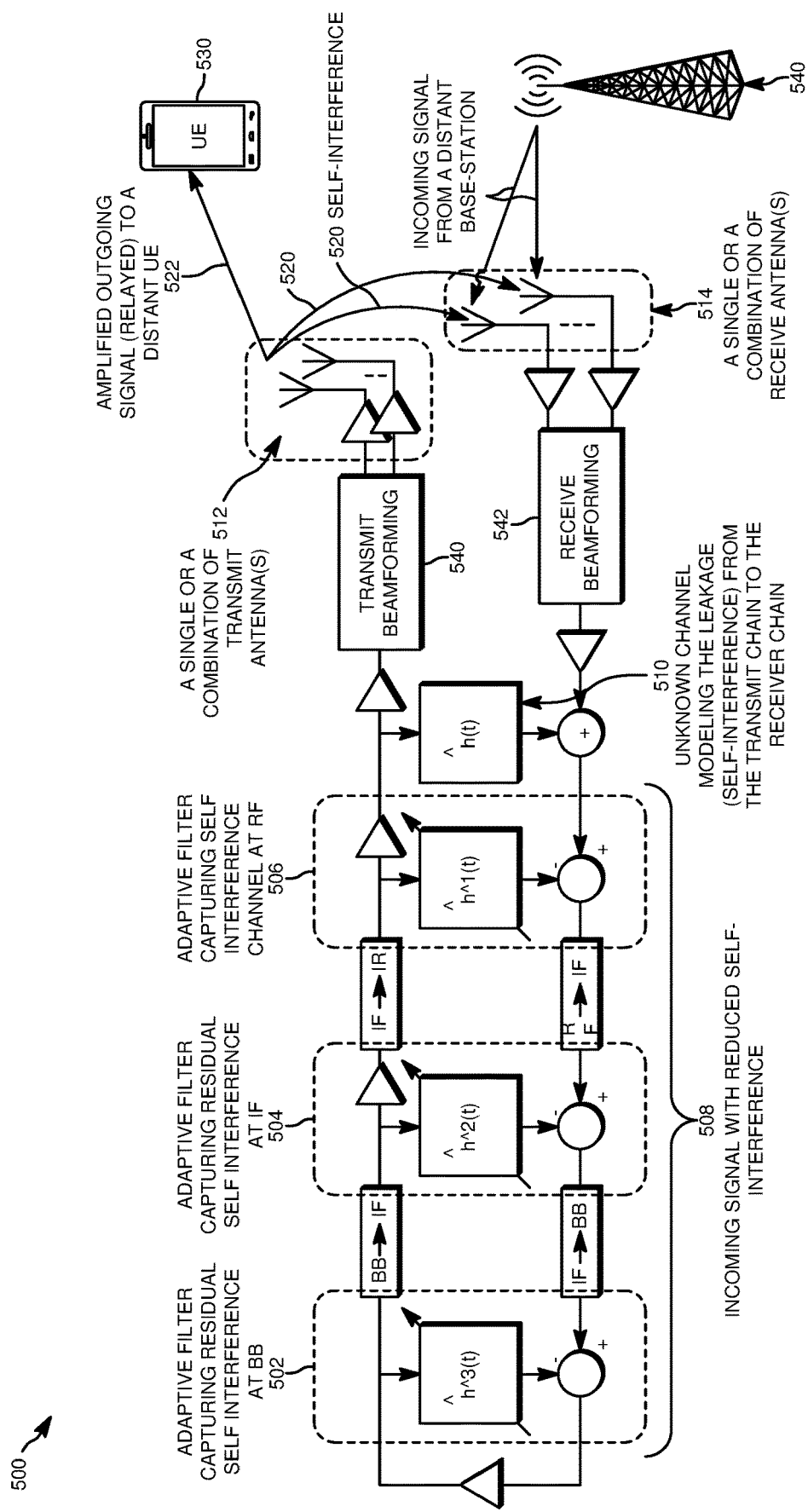
FIG. 5 illustrates a nested collection of echo cancelling adaptive filters, at the RF (Radio Frequency), IF (Intermediate Frequency) and BB (Base-band) in accordance with one or more embodiments.

At least one embodiment discloses methods for performing the adaptive filtering for echo cancellation in an Intermediate Frequency (IF). In another embodiment, the adaptive filtering for echo cancellation is performed at RF, followed by another stage (also referred to as "layer") of filtering for echo cancellation at the analog base-band. FIG. 5 depicts three possible layers of echo-cancellation, and it will be clear to individuals skilled in the area that a subset, or all these three layers, may be used.

To adaptively adjust different filters, one or more embodiments disclose methods to add a low-power training signal to the outgoing signal. In this case, the receiver side within the same relay unit will extract the training signal and use it to calculate the impulse response of the self-interference channel, thereby making it possible to adapt the echo cancellation filter to follow this impulse response. Similar guidelines apply to the adaptation of beamforming filters (see FIG. 3 as an example). One or more embodiments disclose methods to add a training signal using a spreading sequence, for example, an Alexis sequence (see, e.g., H. D. Luke, "Binary Alexis sequences with perfect correlation," in *IEEE Transactions on Communications*, vol. 49, no. 6, pp. 966-968, June 2001, incorporated by reference herein), or a maximum length sequence (MLS).

De-spreading the signal at the receiver side, followed by averaging in time, increases the signal-to-noise ratio in the estimation of the impulse response of the self-interference channel, without the need to increase the power of the training signal. Another embodiment includes methods to adapt the power of the training signal when there is need to increase the corresponding signal-to-noise ratio to improve the adaption of the filter to better follow the changes in the self-interference channel. In another embodiment, methods rely on a combination of known methods for blind adaptive filtering, and addition of the training signal to realize the required adaptive filtering operation without unnecessarily increasing the power of the training signal. It is also important to provide a high signal-to-noise ratio for the added training signal. Noting the sequence used in the construction of the training signal is available at the same unit, one or more embodiments exploit this feature and improve signal-to-noise ratio in detecting/extracting the training signal by implementing a simple correlator receiver (at the RF) for the coherent extraction of the training signal.

Referring now to FIG. 5, an echo cancellation loop circuit 500 used in different embodiments for the direct cancellation of self-interference is illustrated. As shown, several adaptive filters 502, 504 and 506 are coupled together. Adaptive filter 502 captures residual self-interference at baseband (BB), adaptive filter 504 captures residual self-interference at an intermediate frequency (IF), and adaptive filter 506 captures self-interference channel at RF (radio frequency). Thus, the nested collection are echo cancelling adaptive filters, at the RF (Radio Frequency), IF (Intermediate Frequency) and BB (Base-band). Each of these stages of echo cancellation has its own advantages. In particular, it is easier to implement complex multiplication (required in adaptive filtering) in the IF or RF domains, and it is easier to implement tunable delay in the base-band. The filters are coupled to unknown channel modeling the leakage (self-interference) from a transmit chain to the receiver chain 510.

The transmit beamforming 540 is provided to a single or a combination of transmit antennas 512 and the amplified outgoing signal can be relayed 522 to user equipment (UE) 530. FIG. 5 also shows Self-interference 520 received at a signal or combination of receive antennas 514. Receive antennas 514 also receives incoming signal from a distant base-station 540. Receive beamforming 5420 then provides signals to the adaptive filters and the channel modeling 510.

Figure 6:
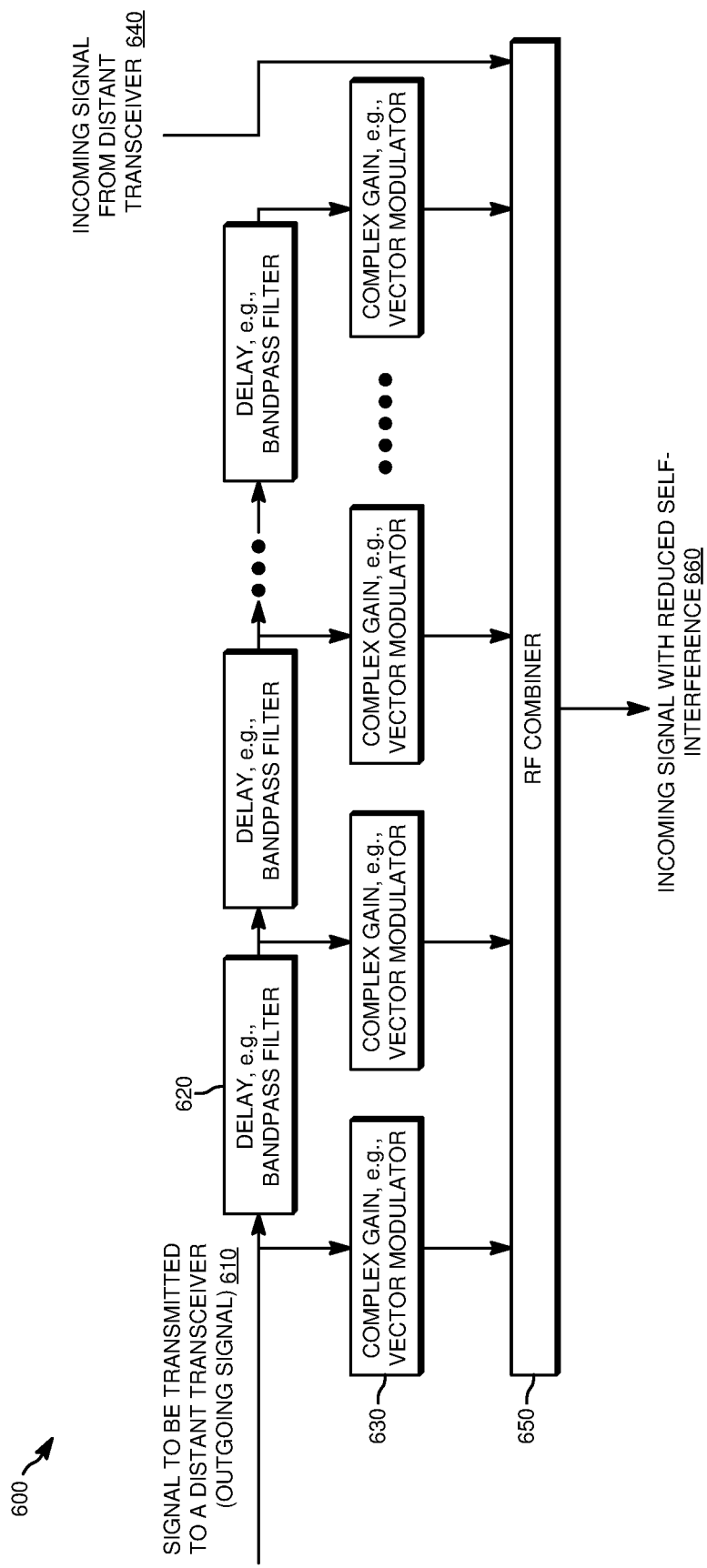
FIG. 6 illustrates a circuit diagram for the realization of the analog adaptive filters in the IF or RF domains in accordance with one or more embodiments.

Referring now to FIG. 6 a block diagram 600 illustrates details of an embodiment for the realization of the analog adaptive filters in the IF or RF domains. In the case of using the full-duplex unit disclosed as an amplify-and-forward relay, the delay added by the full-duplex unit should be small. It is not possible to apply digital signal processing techniques to adapt/adjust the echo cancellation filter. A digital implementation of such a filtering operation would add too much delay, which is unacceptable in many scenarios of using a wireless relay. To overcome this problem, embodiments disclose methods to implement such an adaptive filter in the analog domain. In particular, embodiments disclose methods to realize the delay elements needed in the filtering operation using bandpass filters around the carrier frequency. The bandpass filters in FIG. 6 can be realized, for example, using RF SAW filters with a bandwidth equal or larger than the signal bandwidth. By cascading several such RF SAW filters, the delay increases proportionally. There will be amplification and/or attenuation in each filter branch to compensate for the mismatches of gain/attenuation among the branches.

As shown a signal 610 to be transmitted to a distant transceiver is received by several delays 620 and several complex gain vector modulators 630. The complex gain vector modulators 630 configured according to an echo channel impulse response as measured with a correlator/RAKE receiver and/or with time reversal signal processing as shown in FIGS. 7 and 8 and an incoming signal from a distant transceiver 640 with self-interference are combined at RF combiner 650 and produce an incoming signal 660 with reduced self-interference.

Figure 7:
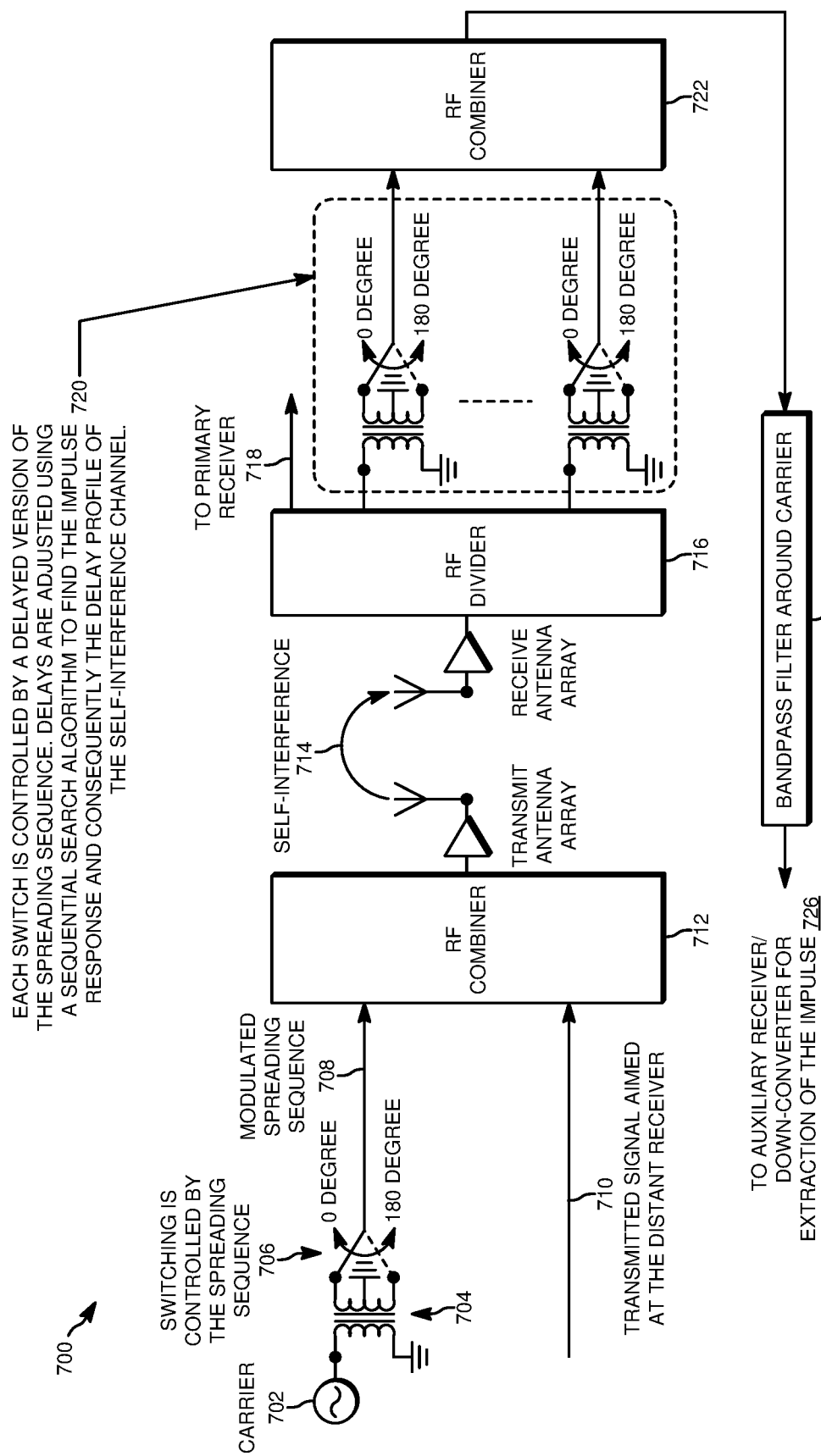
FIG. 7 illustrates a circuit diagram wherein the training signal is directly added at the transmit RF front-end and directly extracted at the receiver RF front end in accordance with one or more embodiments.
Figure 8:
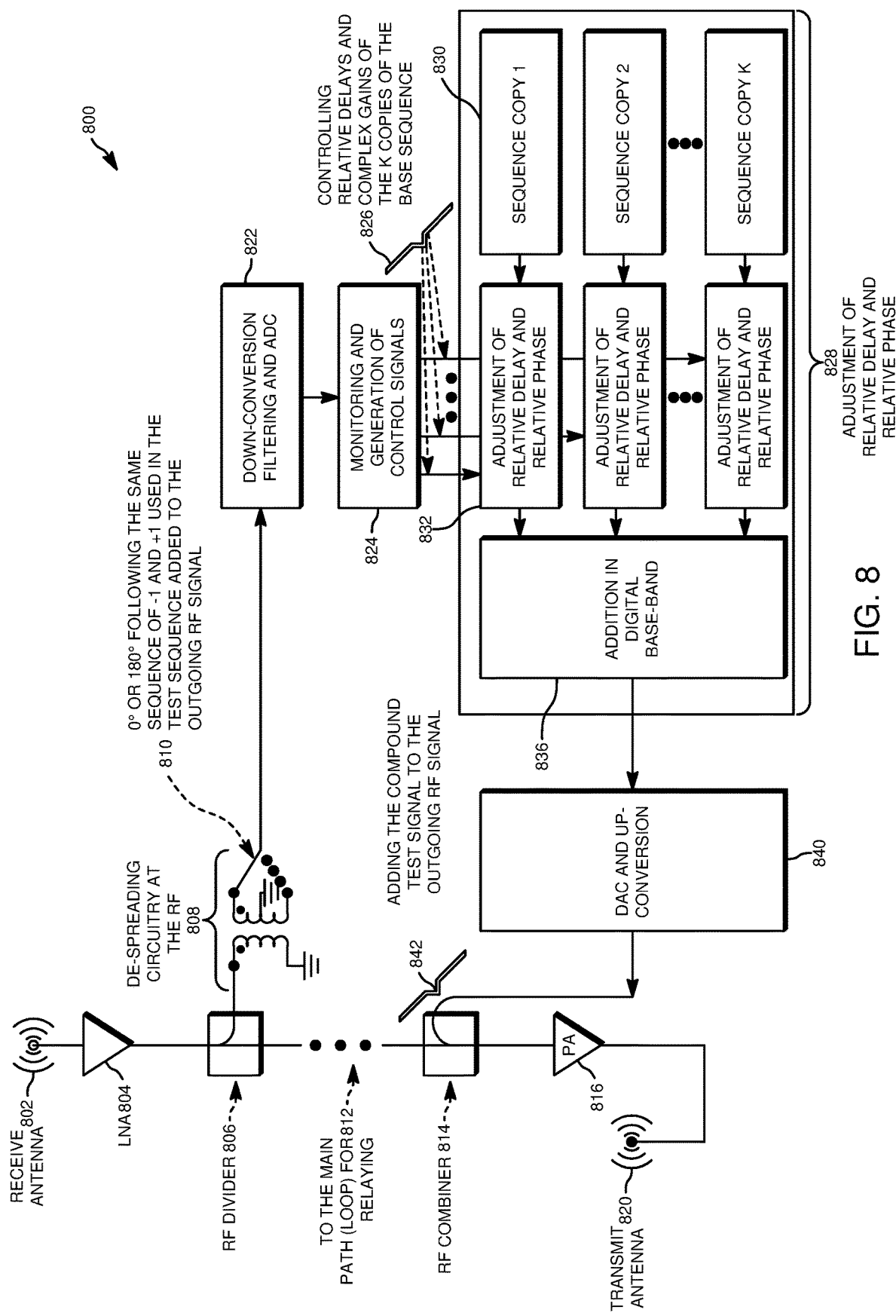
FIG. 8 illustrates a circuit diagram wherein the training signal is directly added at the transmit RF front-end and directly extracted at the receiver RF front end in accordance with one or more embodiments.

Referring now to FIGS. 7 and 8, pictorial views of such an embodiment are illustrated wherein the training signal is extracted by chopping the received signal (which includes the training signal) according to the successive −1 or +1 values in the spreading sequence as used in the construction of the training signal.

In the embodiment depicted in FIG. 7, several copies of the spreading sequence, with adjustable relative delays, are used at the correlator receiver to help in extracting the impulse response of the self-interference channel. Knowing the impulse response helps in deciding for the tunable delay values and the complex gain values required in the echo cancellation filtering.

Specifically, FIG. 7 illustrates circuitry 700 including a carrier 702 received at Balun 704 with switching controlled by a spreading sequence 706. The modulated spreading sequence 708 and a transmitted signal 710 aimed at the distant receiver are provided to RF combiner 712 and transmitted. Self-interference 714 illustrates the self-interference between transmit and receive antenna arrays. The received signals go to RF divider 716 and provided to a primary receiver 718 and switches 720 that are controlled by a delayed version of the spreading sequence. Delays are adjusted using a sequential search algorithm to find the impulse response and consequently the delay profile of the self-interference channel. The output of the control switches 720 is provided to RF combiner 722 and then to bandpass filter 724 and to an auxiliary receiver/down converter for extraction of the impulse response of the self-interference channel 726.

FIGS. 7 and 8 demonstrate embodiments wherein the training signal is directly added at the transmit RF front-end and directly extracted at the receiver RF front end. Spreading and de-spreading operations in embodiments shown in FIG. 7 and FIG. 8 is performed by switching operations at the RF, which is equivalent to Binary Phase Shift Keying (BPSK) modulation of the sequence used in training. Noting that the values of the spreading sequence used for the purpose of training is fixed, embodiments exploit this feature and reduce hardware cost by implementing a simple transmitter and a simple correlation receiver for the generation/extraction of the training signal.

FIGS. 7 and 8 show pictorial view of such an embodiment, wherein the training signal is generated by chopping a carrier sinusoidal input according to the successive −1 or +1 values in the spreading sequence used in the construction of the training signal. In summary, the operation of de-spreading in the analog RF domain in FIGS. 7 and 8 enables increasing the effective signal-to-noise ratio in measuring the impulse response of the self-interference channel. Adjusting the relative delays of the de-spreading sequences provides an additional tool to improve signal-to-noise ratio in sampling of the impulse response, in particular enabling the search procedure to accurately find the delay values associated with dominant paths in the self-interference channel. Delays are adjusted using a sequential search algorithm to find the impulse response and consequently the delay profile of the self-interference channel is computed.

Referring to FIG. 8, circuit 800 illustrates receive antenna 802 provided to LNA 804 and then RF divider 806. The divider 806 provides signals to a main path for relaying 812 and a de-spreading circuitry at the RF 808. De-spreading circuitry includes a) or 180 degree switch 810 following the same sequence of −1 and +1 used in the test sequence added to the outgoing RF signal, next the signal is provided to down-conversion filtering and analog to digital converter (ADC) 822. The down converted filter is provided to monitoring and generation of control signals 824 which then are provided to controlling relative delays and complex gains of the K copies of the base sequence 826, which are provided to sequence pre-equalizer 828. Sequence pre-equalizer 828 includes K adjustment of relative delay and relative phase blocks 832 which receive K copies of sequences 830, and are provided to addition block 836 in digital base band.

The output of sequence pre-equalizer 828 is received by digital to analog converter (DAC) and up conversion block 840. At step 842, the analog output of block 840 is added as a compound test signal to the outgoing RF signal at RF combiner 814. The combined signal is provided to power amplifier 816 and to transmit antenna 820.

The embodiment depicted in FIG. 8 shows delayed copies of the spreading sequence used in training are superimposed at the transmit side in a manner similar to pre-equalization, but for the purpose of extracting the impulse response of the self-interference channel through pre-construction and matching. The relative delays and complex gains associated with different copies of the spreading signal are adjusted in the pre-construction procedure such that, upon de-spreading, the effects of all propagation paths in the self-interference channel are added coherently. This objective will be achieved when the power at the carrier at the output of the de-spreading switching circuitry on the receiver side is maximized. This provides a mechanism to guide the pre-construction of the training signal. The impulse response is found by adjusting the relative delays and complex gains such that the power at the carrier at the output of the de-spreading switching circuitry on the receiver side is maximized. In addition to the power in the carrier, the base-band signal after down-conversion is used as an input to a signal processing algorithm that computes further details of the impulse response (relying on basic properties of linear systems).

In the embodiment depicted in FIG. 8, several copies of the spreading sequence, with adjustable relative delays, are used in the construction of the training signal at the transmit side.

Referring back to FIG. 5, the different stages (layers) of echo cancellation in FIG. 5 can be trained sequentially (in a nested manner) by relying on the training procedure demonstrated in FIGS. 7 and 8, wherein each layer of echo cancellation is adjusted while other layers are kept fixed. It will be clear to individuals skilled in the arts that a similar echo cancellation structure can be used in a full-duplex transceiver. In the case of a full-duplex transceiver, filtering for self-interference cancellation can be a combination of filtering in RF, IF, analog baseband, and digital baseband.

In other embodiments, the amount of delay in the delay elements used in the cancellation filters is tunable. The tuning algorithm then finds the best values for the delay elements and their corresponding complex gains. In one embodiment, variable delay elements are used in the cancellation filter in analog base-band (or low IF) and delays are adjusted by using low-band filters with tunable/selectable bandwidths. By adjusting the bandwidth of each low-pass filter, or by selecting the low-pass filter among a set of available low-pass filters with different bandwidths, the value of the corresponding delay element can be tuned. In one or more embodiments, the signal processing algorithms used to compute the filters' delay elements and their corresponding complex gain values are performed on the digital samples in the baseband, and then the instructions to adapt the tunable elements (delay values and/or complex gain values) are applied to filtering in the analog domain.

Figure 9:
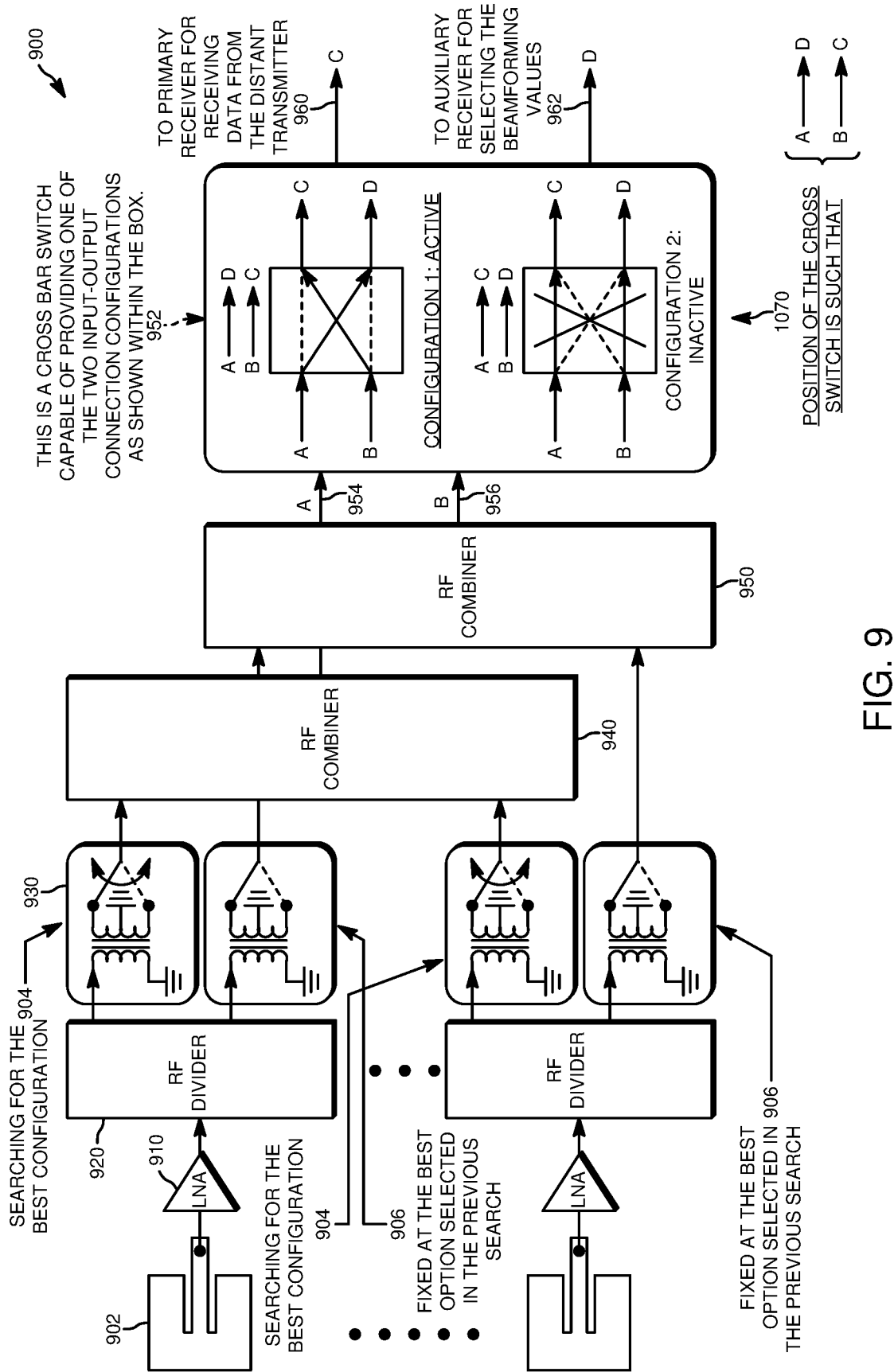
FIG. 9 illustrates a circuit diagram of the first of the two states in a switched training mechanism in accordance with one or more embodiments.
Figure 10:
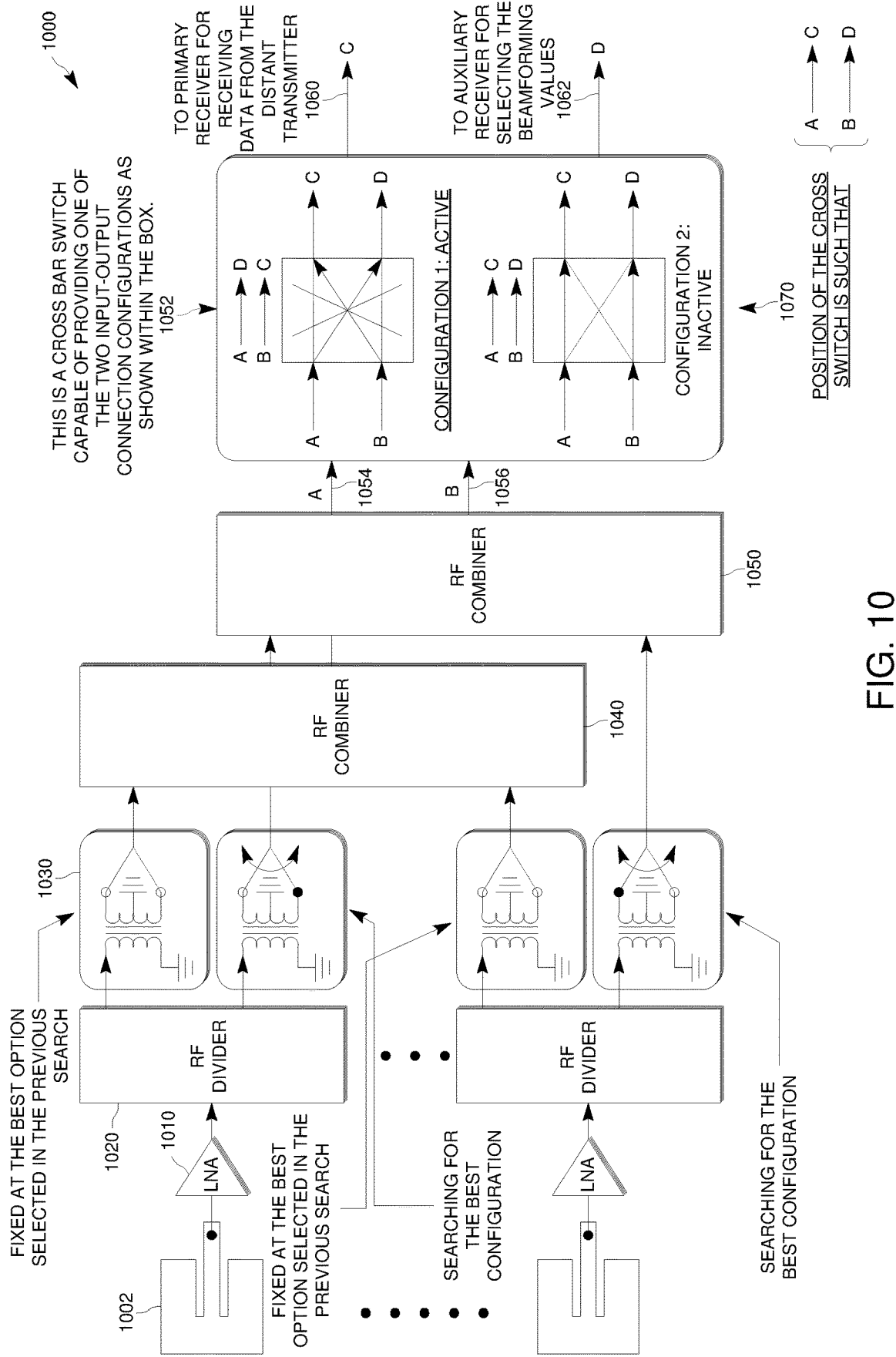
FIG. 10 illustrates a circuit diagram of the second of the two states in a switched training mechanism in accordance with one or more embodiments.

Referring to FIGS. 9 and 10 depict pictorial views of a disclosed switched training mechanism. Wireless protocols typically rely on transmitting a training signal by the transceiver, which is extracted at the receiving end and used in channel equalization. Such training signals are sent periodically, and/or upon a request by the receiving end. On the other hand, the process of receive beamforming results in changing the equivalent (end-to-end) channel from the distant transmitter to the receiver. As a result, beamforming values (phases and/or complex gain values) should not be changed once the receiver side has extracted the distant training signal and is using it for the purpose of equalization (until the next distant training signal becomes available, and equalization is refreshed). To solve this problem, some embodiments disclose replacing each beamforming circuitry with two beamforming circuitries. At any given time, one of these two circuitries undergoes new learning, while the other one is kept fixed and is used to provide the beam-formed signal.

FIGS. 9 and 10 depict pictorial views of such an embodiment, depicted in conjunction with first stage of beamforming using {0',180'} phase adjustments. As an example, in the case of full-duplex in-band relaying, the primary receiver in FIG. 9, and similarly the one in FIG. 10, deals with the signal to be relayed, while the auxiliary receiver is responsible for monitoring the received signal and extracting the best beamforming values to be used in the next round. In successive rounds, one set of beamforming values, i.e., {0',180'} phase values, relevant to one of the beamforming circuitries is refreshed (through the auxiliary receiver), while the set that has been refreshed in the previous round is used to feed the primary receiver to close the loop in the relaying operation.

FIG. 9 illustrates circuit 900 with patch antennas 902 coupled to low noise amplifiers 910. As shown a search 904 for the best configuration of antennas takes place and fixed at the best option at 906. LNAs 910 are shown coupled to RF dividers 920 and switches 930, RF combiners 940, and 950 and provided as signals A 950 and B 956 to cross bar switch 952, which provides signal C to a primary receiver for receiving data from the distant transmitter 960, and signal D to auxiliary receiver for selecting the beamforming values 962. AS shown the position of the cross switch is set at 970 as A->D and B->C.

FIG. 10 illustrates circuit 1000 with patch antennas 1002 coupled to low noise amplifiers 1010. As shown a search 1004 for the best configuration of antennas takes place and fixed at the best option at 1006. LNAs 1010 are shown coupled to RF dividers 1020 and switches 1030, RF combiners 1040, and 1050 and provided as signals A 1050 and B 1056 to cross bar switch 1052, which provides signal C to a primary receiver for receiving data from the distant transmitter 1060, and signal D to auxiliary receiver for selecting the beamforming values 1062. As shown the position of the cross switch is set at 1070 as A->D and B->C.

FIGS. 9 and 10 depict such an interlaced training/use in the context of first stage of receive beamforming. A similar structure would be applicable to the second stage of receive beamforming. Wireless standards, such as LTE (Long-Term Evolution), rely on broadcast signals for purposes such as synchronization, frequency mismatch estimation/correction, transmission of base-station ID (cell ID). In the case of LTE, one such broadcast signal is the so-called Sounding Reference Signal (SRS). SRS is transmitted in regular time intervals. Methods herein rely on measurements performed on such broadcast channels to extract the cell ID, service provider ID, and also decide for the beamforming values (for the purpose of maximizing the level of signal received from the distant transmitter). Methods described herein select receive beamforming values to maximize the received signal strength, and/or reduce self-interference. There is an auxiliary receiver which selects the beamforming values by processing a copy of the received signal, called "test signal" hereafter, which, for example, could be the SRS signal in the case of LTE. This operation is achieved by measuring the impact of adjustments in beamforming values on the level of test signal received by the auxiliary receiver. In one embodiment, relying on the sequential greedy search algorithm or similar algorithm explained earlier, phase values are successively changed by 180's and between the two options for each phase value, the one that results in a higher level for the test signal arriving from the distant transceiver is selected. In a preferred embodiment, the power of SRS is used to select the antenna beamforming values. At any given time, one of the two beamforming circuitries is used to provide the primary signal to the primary receiver, and the other one of the two beamforming circuitries is used to provide the test signal to the auxiliary receiver. The time interval between two successive SRS is the time that is available to test the effect of a sign change due to one of the {0',180' } phase circuits. To achieve this goal, auxiliary receiver first extracts the time boundaries of successive OFDM symbols (time synchronization). Then, for example, if there are 100 receive antenna elements, and the sequential search algorithm is repeated twice (two times sweeping through successive {0',180' } phase adjustments), then it takes 200 successive SRS symbols to complete the task of refreshing the phase values of all {0',180'} phase shifters in the beamforming circuitry that is being refreshed. Upon completion of such a refreshing task, the roles of the two beamforming circuitries will be swapped. This means, the circuitry that is being just refreshed will be used to feed the primary receiver for relaying, and the other circuitry will be monitored by the auxiliary receiver for the purpose of being refreshed. The swapping of the roles of the two beamforming circuitries should be performed in a time interval that does not compromise the operations of channel equalization. In one embodiment, this swapping instant is selected to overlap with: (i) A broadcast signal that does not undergo equalization, for example, the signal used to compute the frequency mismatch. And/or (ii) early parts of the OFDM cyclic prefix, because the early parts of cyclic prefix will be dropped when the final receiving node extracts samples to construct the successive OFDM symbols. Methods described herein have been explained in the context of a single chain (a single carrier frequency), in the language of an amplify-and-forward (full-duplex) relay. In case of having multiple carriers, for example in a Frequency Division Duplex (FDD) system, multiple of such chains can be deployed, each handling a different carrier frequency. The addition of a corrective (filtered) signal for the purpose of echo cancellation has been primarily explained in the context of addition in the RF domain. Methods described herein also include construction and inclusion (addition) of a corrective echo cancelling signal in the Intermediate Frequency (IF) and/or Base-band (BB). FIG. 6 shows a pictorial view of a combination of three stages of echo cancellation in the RF, IF and BB. Working in the RF domain simplifies the task of complex multiplication. Working in the IF domain facilitates incorporating multiple carrier frequencies in a single unit for multi-band operation. This means, multiple carrier frequencies are down-converted to the same IF and filtering is performed on the IF signal. Working in the BB domain simplifies the task of implementing tunable delay elements, by using a filter bank composed of multiple filters with different (tunable) bandwidths. The bandwidth of the filter is inversely related to the filter's delay. To realize longer delay values, multiple such filters (or filter banks) can be cascaded.

Figure 11:
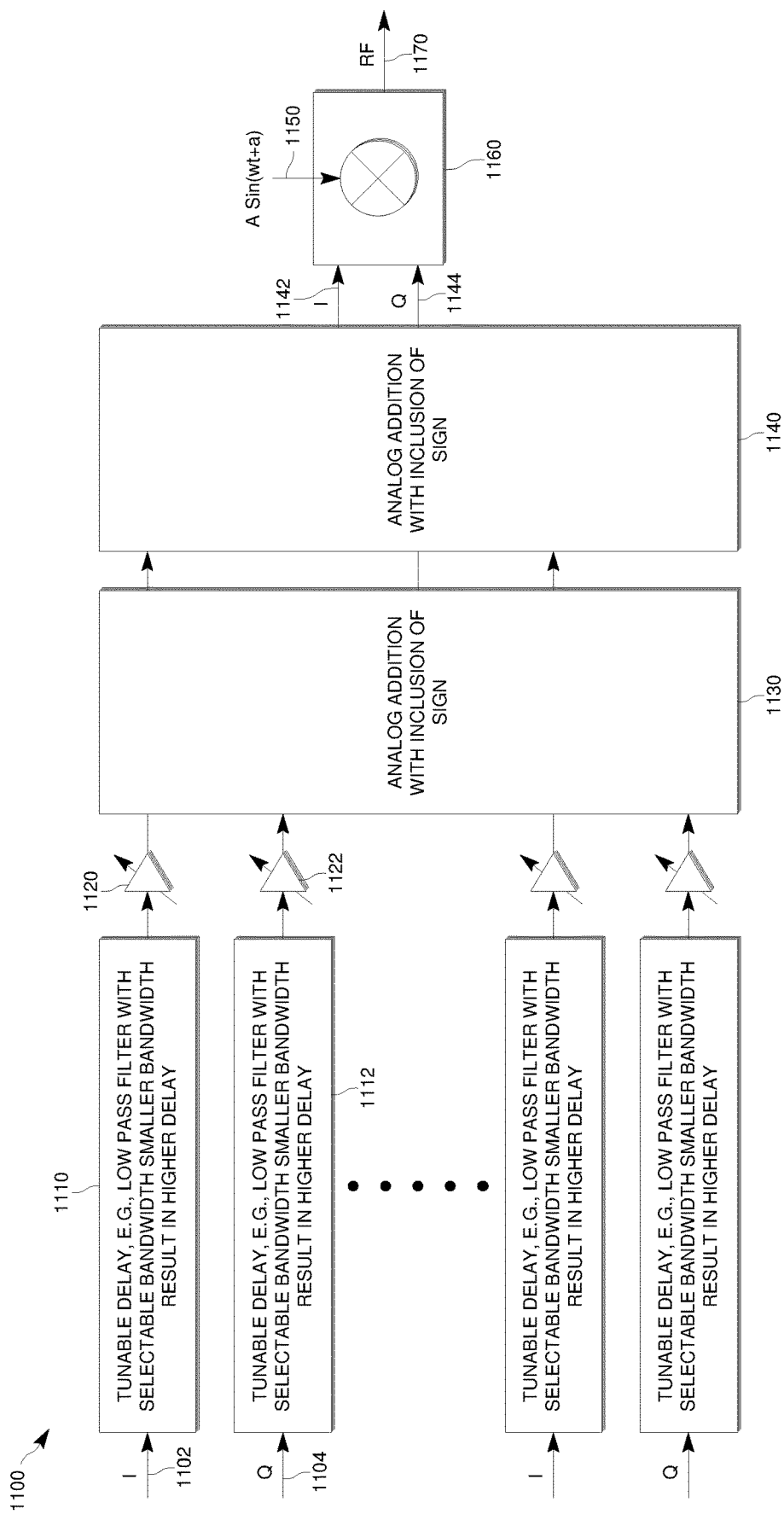
FIG. 11 illustrates a nested echo-cancellation filter structure in accordance with one or more embodiments.

FIG. 11 depicts a pictorial view 1100 of a disclosed nested echo-cancelation structure. Working in the BB has the challenge of implementing complex multiplication. In one embodiment, this task is performed in the BB by amplifying the I and Q signals with different gain values, including a sign change. FIG. 11 depicts a pictorial view of such an embodiment. In one or more embodiments, the multiplication by complex values required in the filtering is achieved at high frequencies, in the IF domain or in the RF domain. In the RF domain, the task can be achieved using: (i) cascade of a tunable phase shifter and a tunable amplifier/attenuator, or (ii) a vector modulator. In the IF domain, say around 400 MHZ, the methods explained above (for complex multiplication in the RF domain) are difficult to realize. To apply a complex multiplication in the IF or BB, embodiments disclose changing the amplitude and/or phase of the carrier used in up-conversion (or in down-conversion) to adjust the phase and magnitude of the up-converted (down-converted) signal. As shown, I 1102 and Q 1104 signals are provided to tunable delays 1110 and 1112 and provided to amplifiers 1120 and 1122, respectively which are then both provided to analog addition with inclusion of sign block 1130 and then analog addition with inclusion of sign block 1140. Output I and Q 1142 and 1144, respectively are then provided to multiply block 1160 fed by A sin(ωt+a) 1150, mixed to provide output RF 1170.

Figure 12:
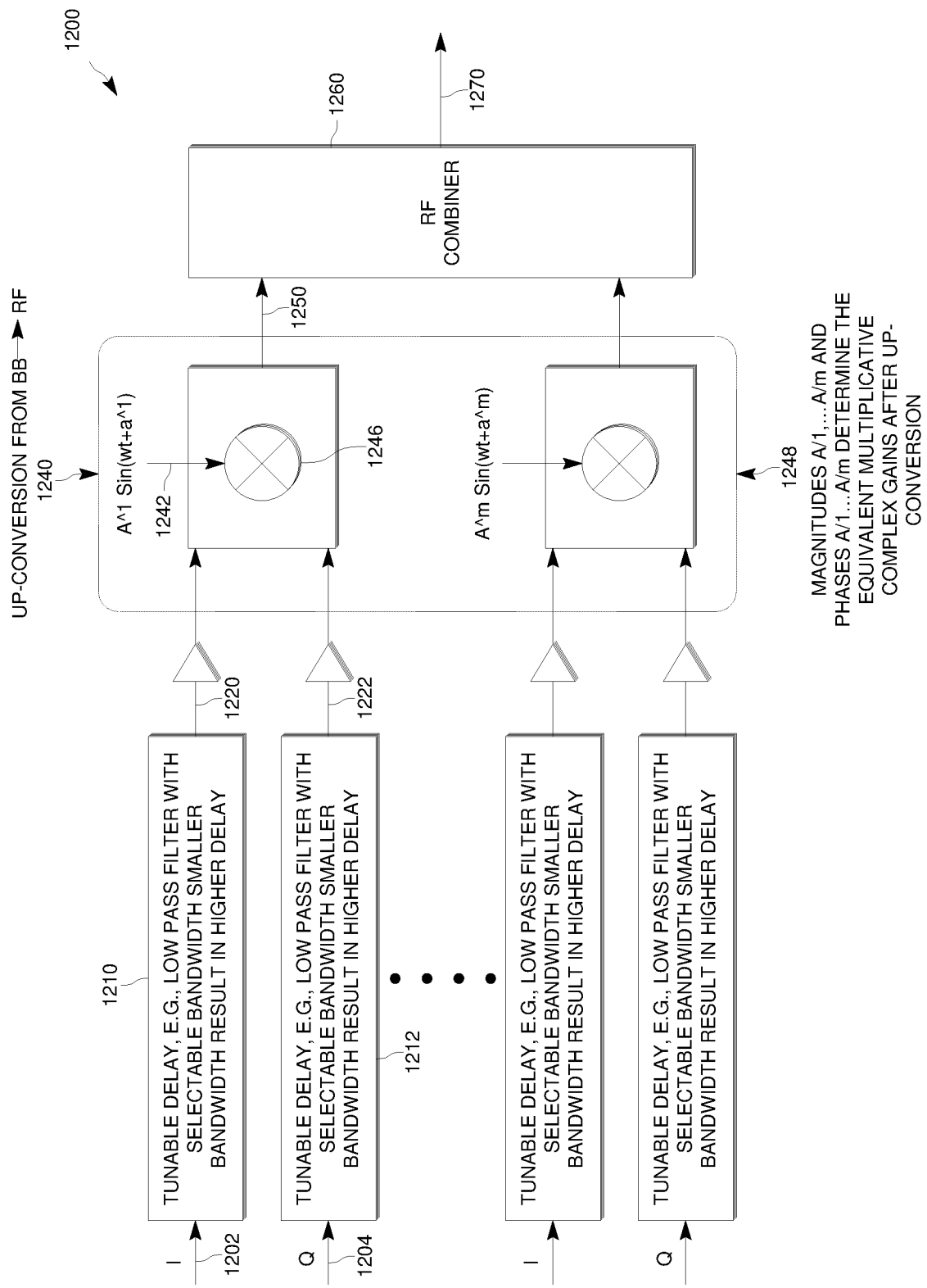
FIG. 12 illustrates a circuit diagram for constructing an echo-cancelation filter in accordance with one or more embodiments wherein the tunable delay values are realized and selected at the base-band and the complex multiplication is performed by modulating the carrier involved in the up-conversion.

FIG. 12 shows the pictorial view 1200 of an embodiment wherein the tunable delay values are selected at the BB and the complex multiplication is performed by modulating the carrier involved in the up-conversion (BB→RF). A filter with N taps requires N−1 such complex multiplications, and this is achieved using N−1 down-converter each with its own carrier. Such carriers are extracted from a Direct Digital Synthesis (DDS) circuit with post-filtering to extract one of the harmonics of the DDS output.

I and Q signals 1202 and 1204, respectively are provided to tunable delays 1210 and 1212, output to amplifiers 1220 and 1222, which are provided to up-conversion block BB to RF 1240.

As shown, up-conversion block 1240 illustrates magnitudes $A_1 \ldots A_m$ and phases $a_1 \ldots a_m$ determine the equivalent multiplicative complex gains after up-conversion 1248. The output of up-conversion block 1250 is provided to RF combiner 1260 to provide output 1270.

Figure 13:
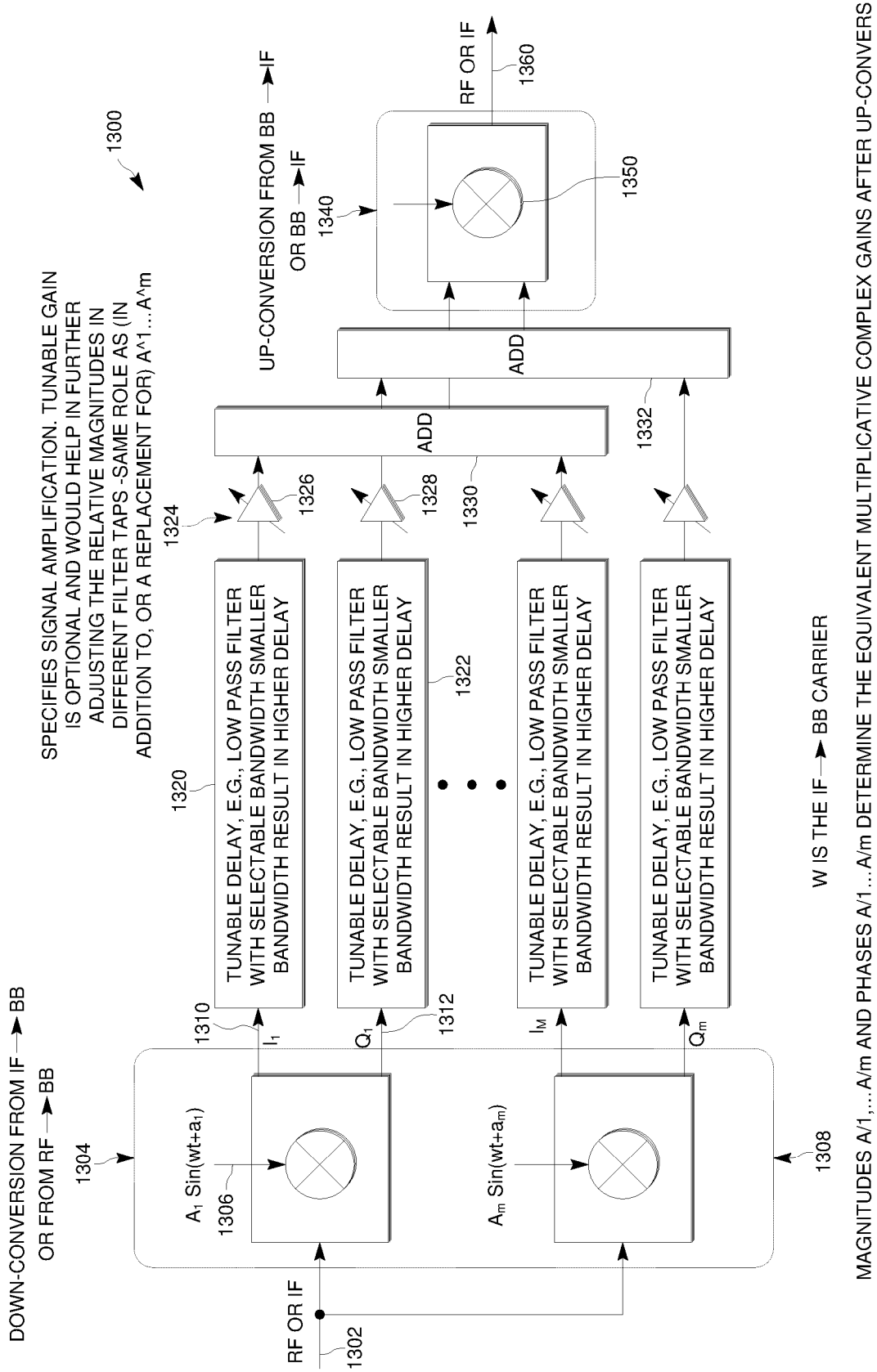
FIG. 13 illustrates an echo-cancellation filter in accordance with one or more embodiments wherein the complex multiplication is performed by modulating the carrier involved in the down-conversion and the tunable delay values are realized by filtering at the base-band.

FIG. 13 shows the pictorial view 1300 of an embodiment wherein the complex multiplication is performed by modulating the carrier involved in the down-conversion and the tunable delay values are realized by filtering at the BB. A filter with N taps requires N–1 such complex multiplications, and this is achieved using N–1 down-converter each with its own carriers. Such carriers are extracted from a Direct Digital Synthesis (DDS) circuit with post-filtering to extract one of the harmonics of the DDS output.

As shown, RF or IF signals 1302 are provided to down-converter 1304, wherein, as shown, at 1308, magnitudes $A_1, \ldots A_m$ and phases $a_1 \ldots a_m$ determine the equivalent multiplicative complex gains after down conversion. Outputs 1310 and 1312 are provided to tunable delays 1320 and 1322, then to tunable amplifiers 1326 and 1328, which, as shown at 1324 are tunable gain amplifiers that are optional and would help in further adjusting the relative magnitudes in different filter taps. After amplifying, the signals are provided to adder 1330, adder 1332, and to upconverter 1340 which provides a mixer 1350 and outputs RF or IF 1360.

Figure 14:
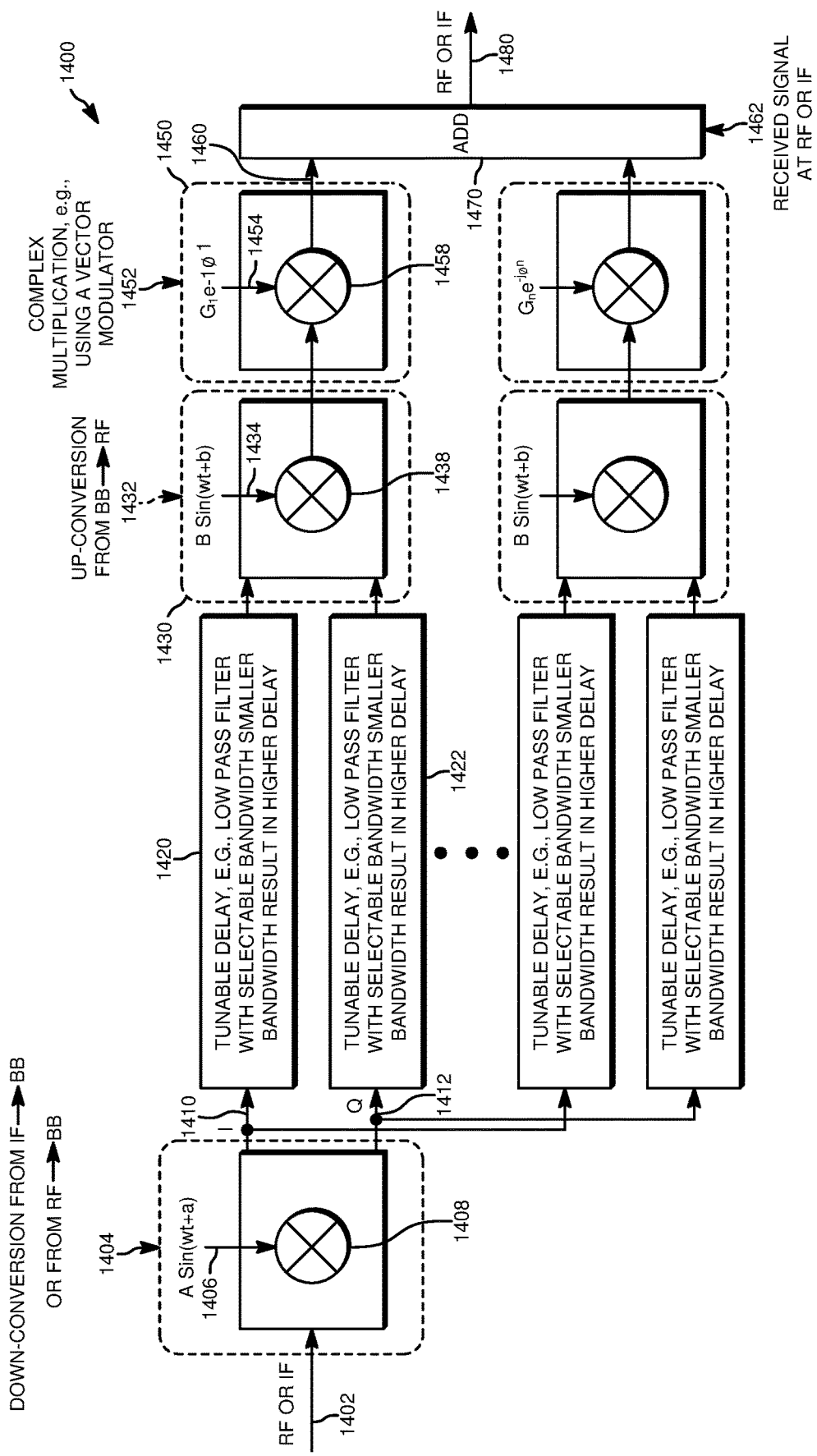
FIG. 14 illustrates an echo-cancellation filter in accordance with one or more embodiments wherein the complex multiplications are performed by using a different vector modulator for each up-converted signal.
Figure 15:
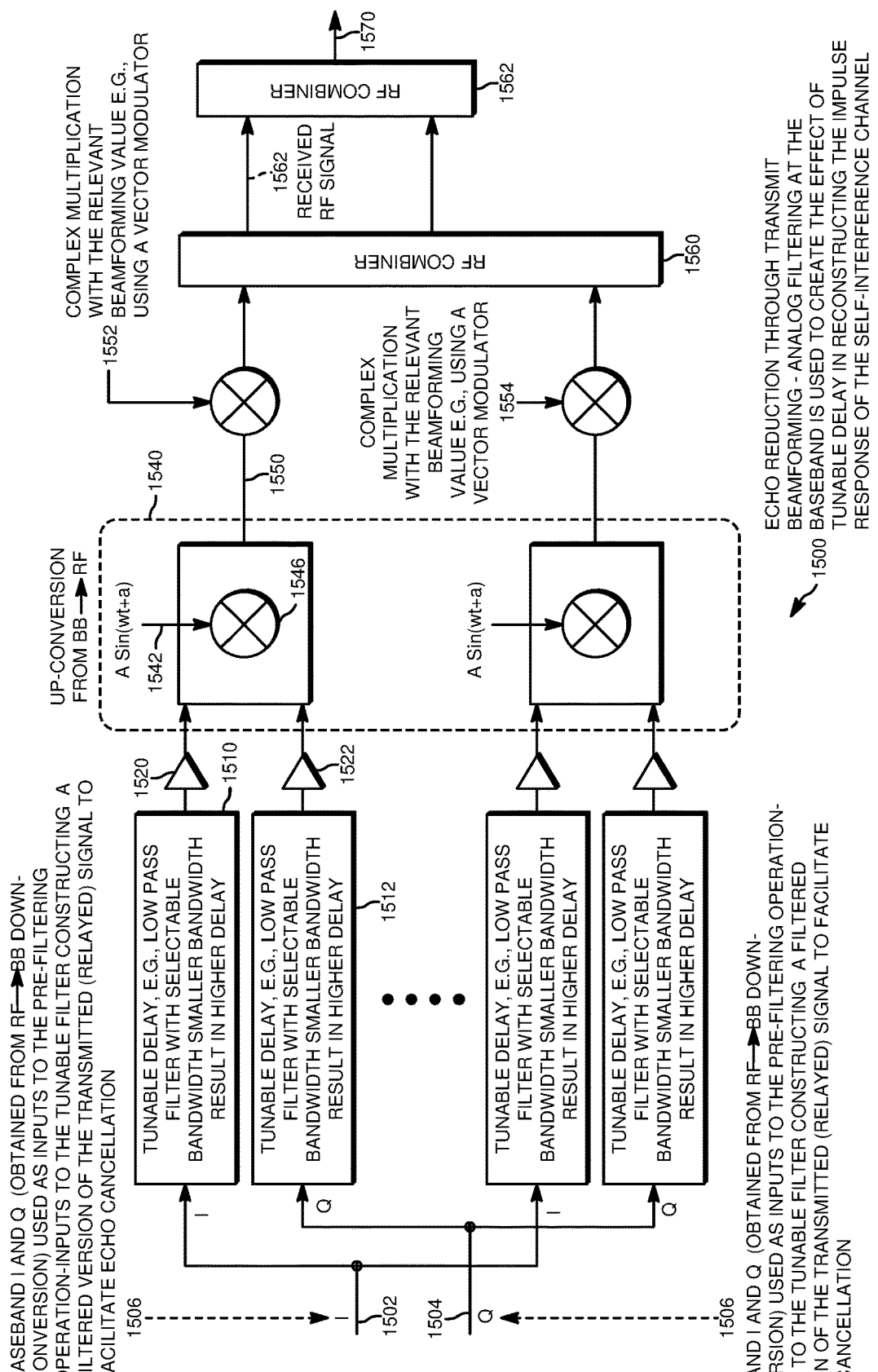
FIG. 15 illustrates a circuit diagram for constructing an echo-cancelation filter in accordance with one or more embodiments wherein the complex multiplications are performed by using a different vector modulator for each up-converted signal.

FIGS. 14 and 15 show pictorial views of another embodiment wherein the complex multiplications are performed by using a different vector modulator for each up-converted signal.

Referring to FIG. 14, block diagram 1400 illustrates RF or IF 1402 received by down-converter 1404, showing A sin(ωt+a) mixed with the signal in mixer 1408 to provide I 1410, and Q 1412 which are then provided to tunable delays 1420, 1422 etc., and then provided to up-conversion block 1430, for mixing B sin(ωt+b) in mixer 1438, then provided to complex multiplier 1450, which as shown uses a vector modulator 1452 shown as $G_i e^{-j\varphi 1}$ 1454 with mixer 1458 to output 1460. The received signal at RF or IF 1462 is then added with add 1470 and output as RF or IF at 1480.

FIG. 15 illustrates block diagram 1500 as an echo cancellation loop using analog filtering at the baseband to create the effect of tunable delay in reconstructing the impulse response of the self-interference channel. As shown, I and Q, 1502, 1504 are baseband I and Q obtained from RF to baseband down-conversion used as inputs to the pre-filtering operation.

I and Q are provided to tunable delays 1510, 1512 and amplifiers 1520, 1522 and then to up-conversion circuitry 1540. As shown, up-converter includes a mixer 1546 mixing incoming signals with A sin(ωt+a) and producing output 1550 provided to complex multiplication with relevant beamforming value 1552. The outputs of both multipliers 1552 and 1554 are provided to RF combiner 1560 which is then provided to RF combiner 1562 with received RF signal 1562 to produce output 1570.

Embodiments depicted in FIGS. 11,12, 13, 14, 15 demonstrate methods for the realization of adaptive filters with tunable delay to be used as part of echo cancellation loop (echo cancellation loop is depicted in FIG. 5). Similar adaptive filtering operations can be used in conjunction with transmit/receive beamforming structures. In some other embodiments, the task of echo cancellation is simplified/ enhanced by applying a suitable filter (pre-equalization filter) to the outgoing signal(s). This operation, referred to hereafter as pre-filtering or pre-equalization, is explained in the language of using FIR pre-filters. It is also possible to rely on IIR filters, which could shorten the effective time span of the impulse response of the self-interference channel, and shape the overall impulse response (pre-filter concatenated with the self-interference channel) for a more effective cancellation of self-interference.

Figure 16:
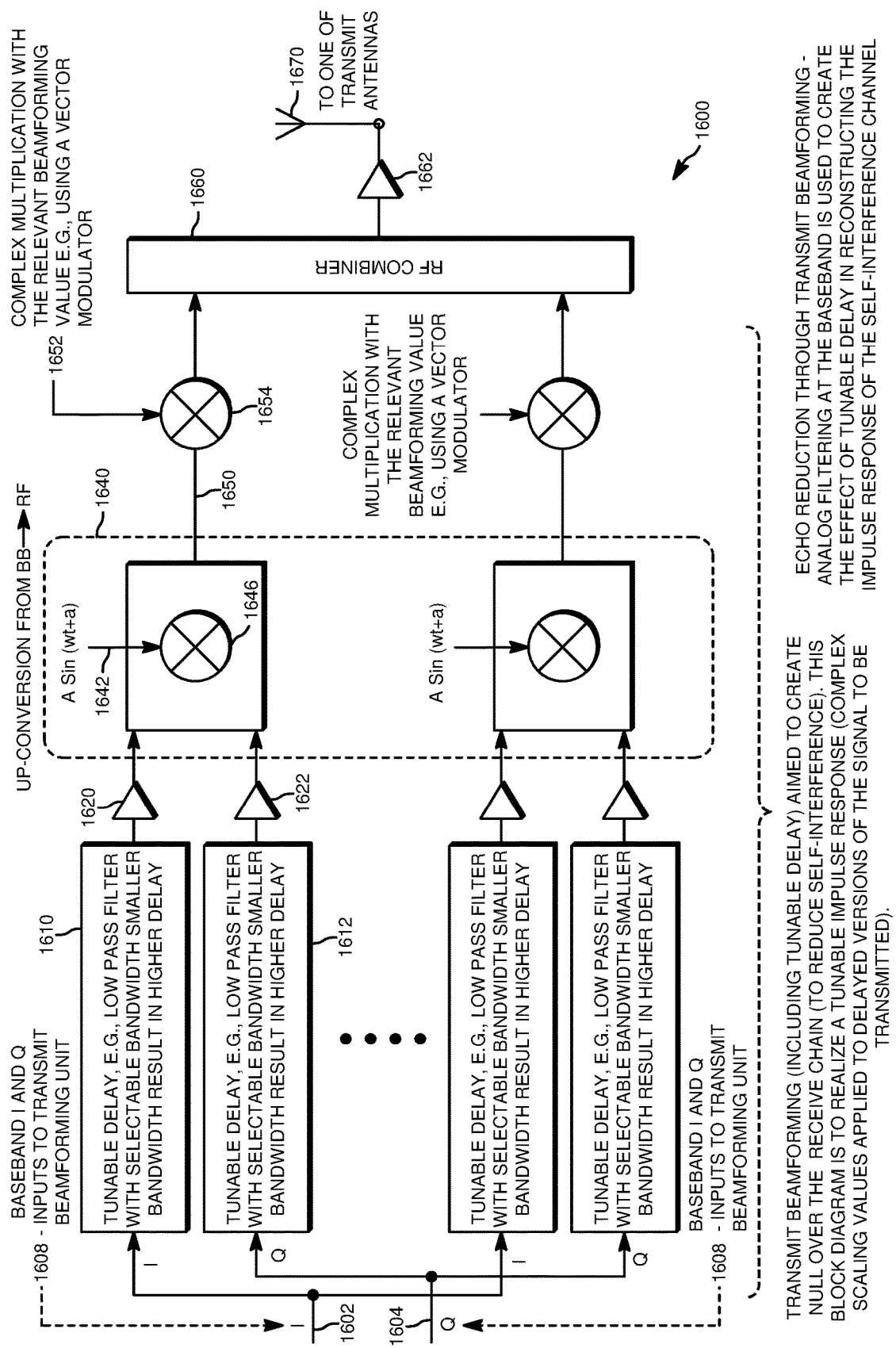
FIG. 16 illustrates a circuit diagram, in accordance with one or more embodiments, for the inclusion of adaptive filtering with tunable delay elements in transmit beamforming acting as pre-equalization filtering components.
Figure 17:
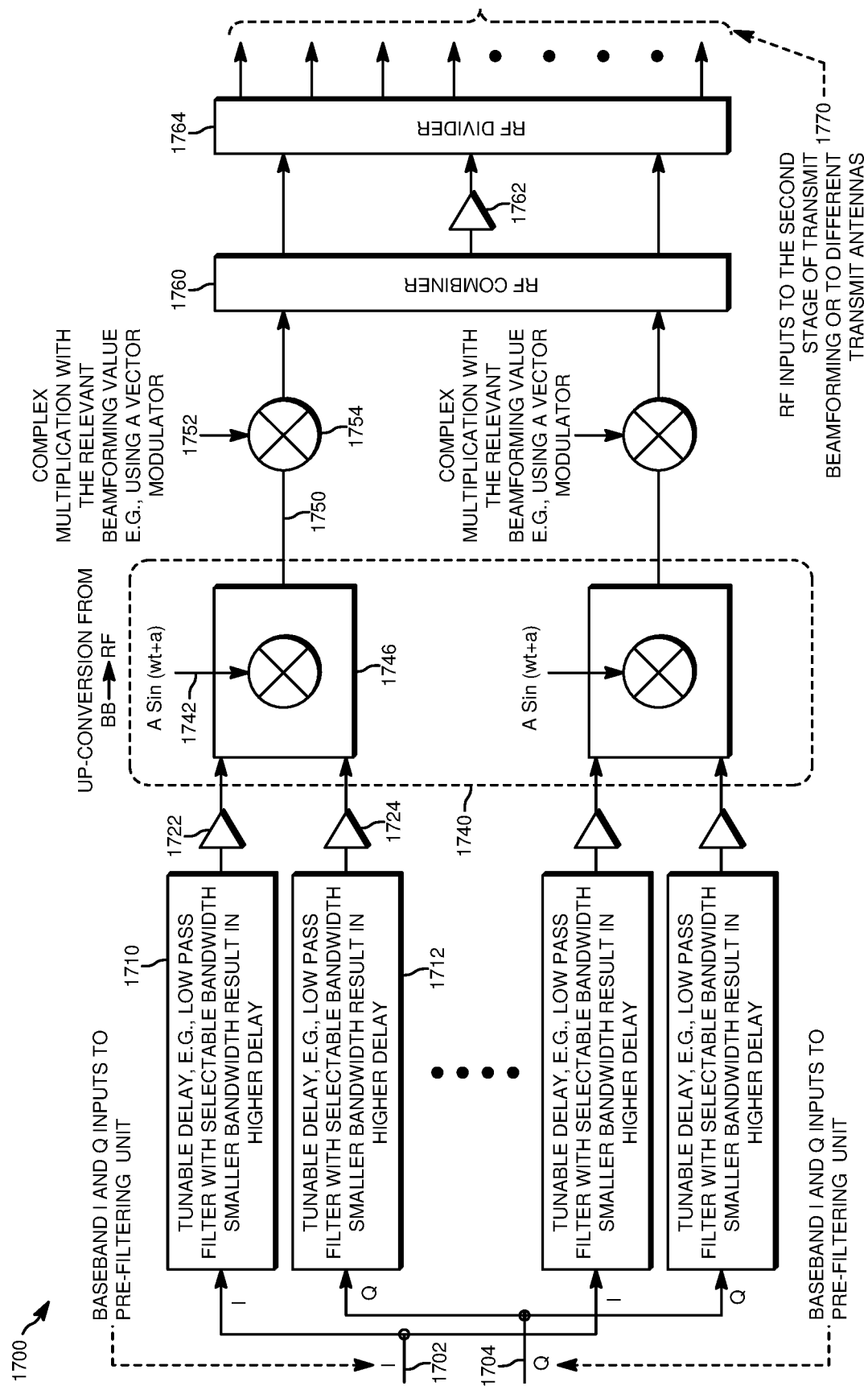
FIG. 17 illustrates a circuit diagram, in accordance with one or more embodiments, for the inclusion of adaptive filtering with tunable delay elements in transmit beamforming acting as pre-equalization filtering components.

FIGS. 16 and 17 depict examples for the inclusion of adaptive filtering with tunable delay elements in transmit beamforming acting as pre-equalization filtering components.

Referring to FIG. 16, adaptive filter 1600 is shown with I 1602 and Q 1604 showing baseband I and Q 1608 are provided to tunable delays 1610 and 1612, amplifiers 1620 and 1622 which are then provided to up-converter 1640. Up-converter 1640 receives the signals and at mixer 1646 and A sin(ωt+a) and provided as output 1650 to complex multiplication with relevant beamforming value 1652 at multiplier 1654. The output of complex multipliers is provided to RF combiner 1660 and output to amplifier 1662 and then to one of the transmit antennas 1670.

FIG. 17, adaptive filter 1700 is shown with I 1702 and Q 1704 showing baseband I and Q are provided to tunable delays 1710 and 1712, amplifiers 1720 and 1722 which are then provided to up-converter 1740. Up-converter 1740 receives the signals and at mixer 1746 and A sin(ωt+a) 1742 and provided as output 1750 to complex multiplication with relevant beamforming value 1752 at multiplier 1754. The output of complex multipliers is provided to RF combiner 1760 and output to amplifier 1762 and then to RF divider 1764 and then becoming RF inputs to a second stage of transmit beamforming or to different transmit antennas 1770.

Figure 18:
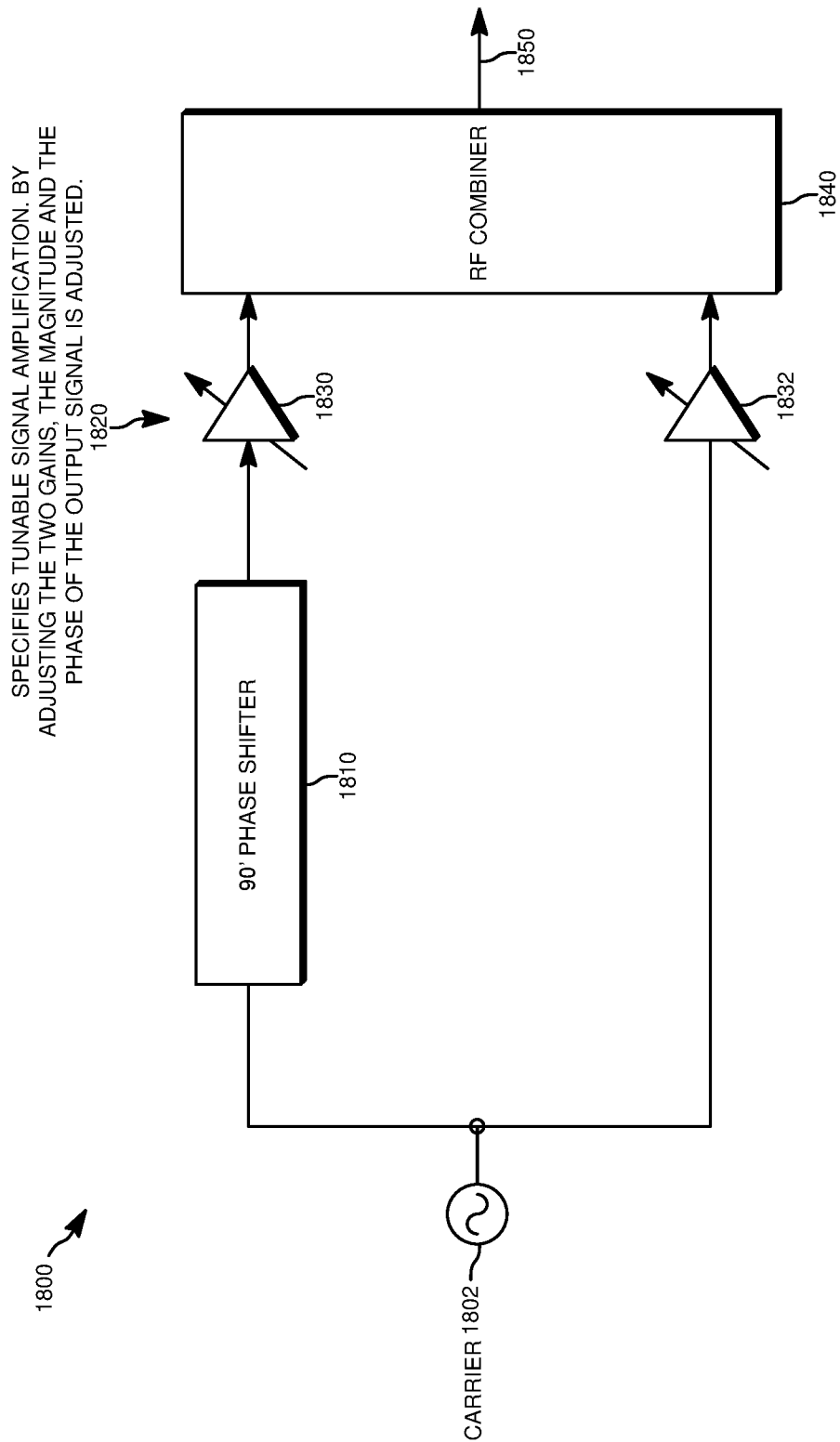
FIG. 18 illustrates a circuit diagram for complex multiplication in accordance with one or more embodiments.

FIG. 18 depicts a pictorial view 1800 of an alternative method for complex multiplication. In this embodiment, a sinusoidal signal 1802 and its 90's phase shifted signal 1810 are added, each with its own adjustable gain value as shown by 1830 and 1832 which are explained at 1820 as tunable signal amplifiers such that the magnitude and phase of the output can be adjusted. Adjustments of these gain values provides the change in the amplitude and phase of the resulting sinusoidal signal obtained through as a result of summation. The outputs are provided to RF combiner 1840 and output at 1850.

Figure 19:
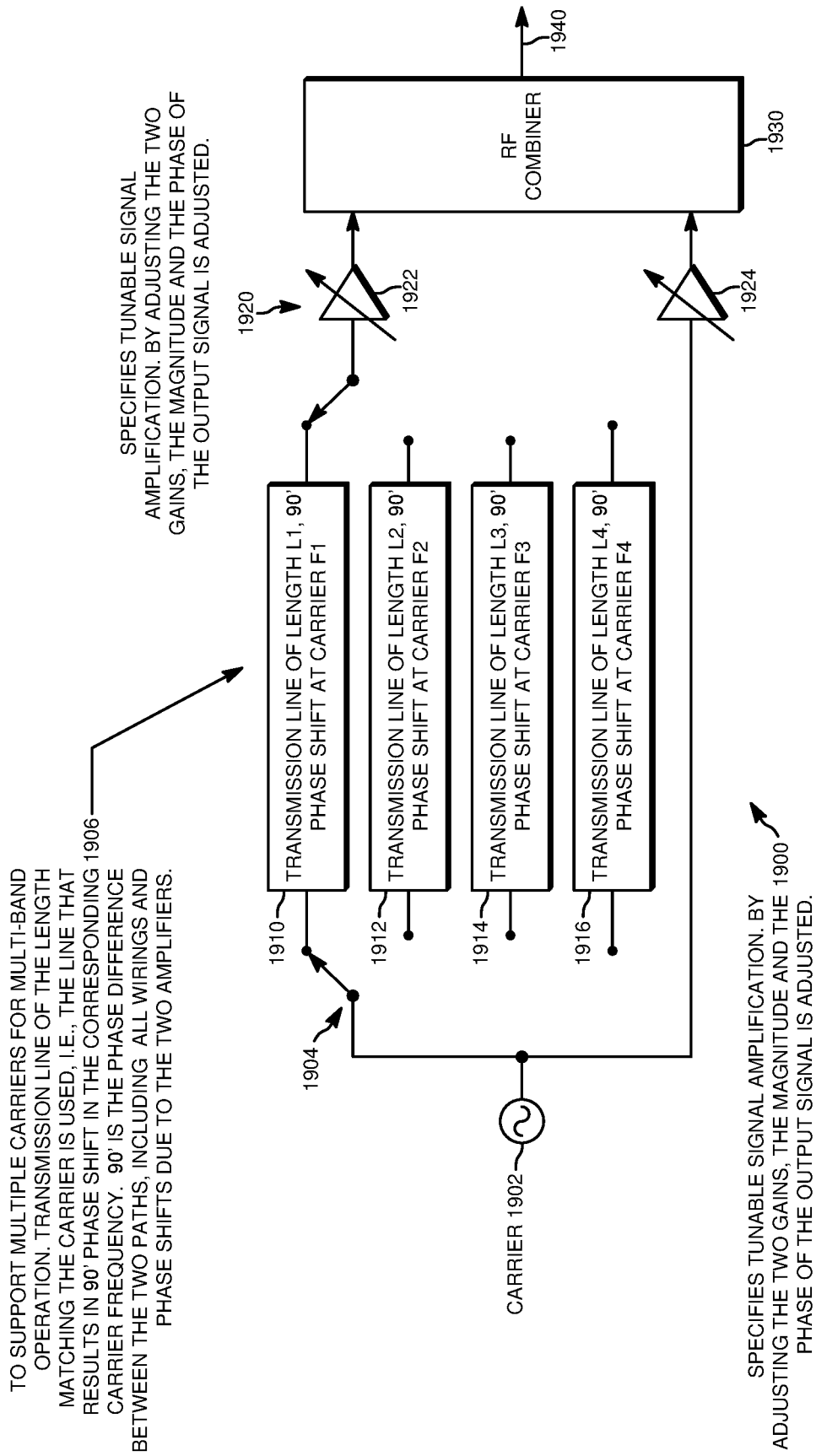
FIG. 19 illustrates a circuit diagram of an alternative method for complex multiplication for multi-band operation, in accordance with one or more embodiments.

FIG. 19 depicts an enhanced version of the complex multiplication circuitry 1900 shown in FIG. 18 for multi-band operation.

As shown, carrier sinusoid 1902 is provided to a switch 1904 to multi-band operation 1906 including transmission line 1910 with length L1 90 degree phase shift at carrier F1 1910; transmission line of length L2 90 degree phase shift at carrier F2 1912; transmission line of length L3 90 degree phase at carrier F3 1914; and transmission line of length L4 90 degree phase shift at carrier F4 1916. Next tunable signal amplifiers 1920 shown as 1922 and 1924 receive the signals and provide them to RF combiner 1930 and output signal at 1940.

Figure 20:
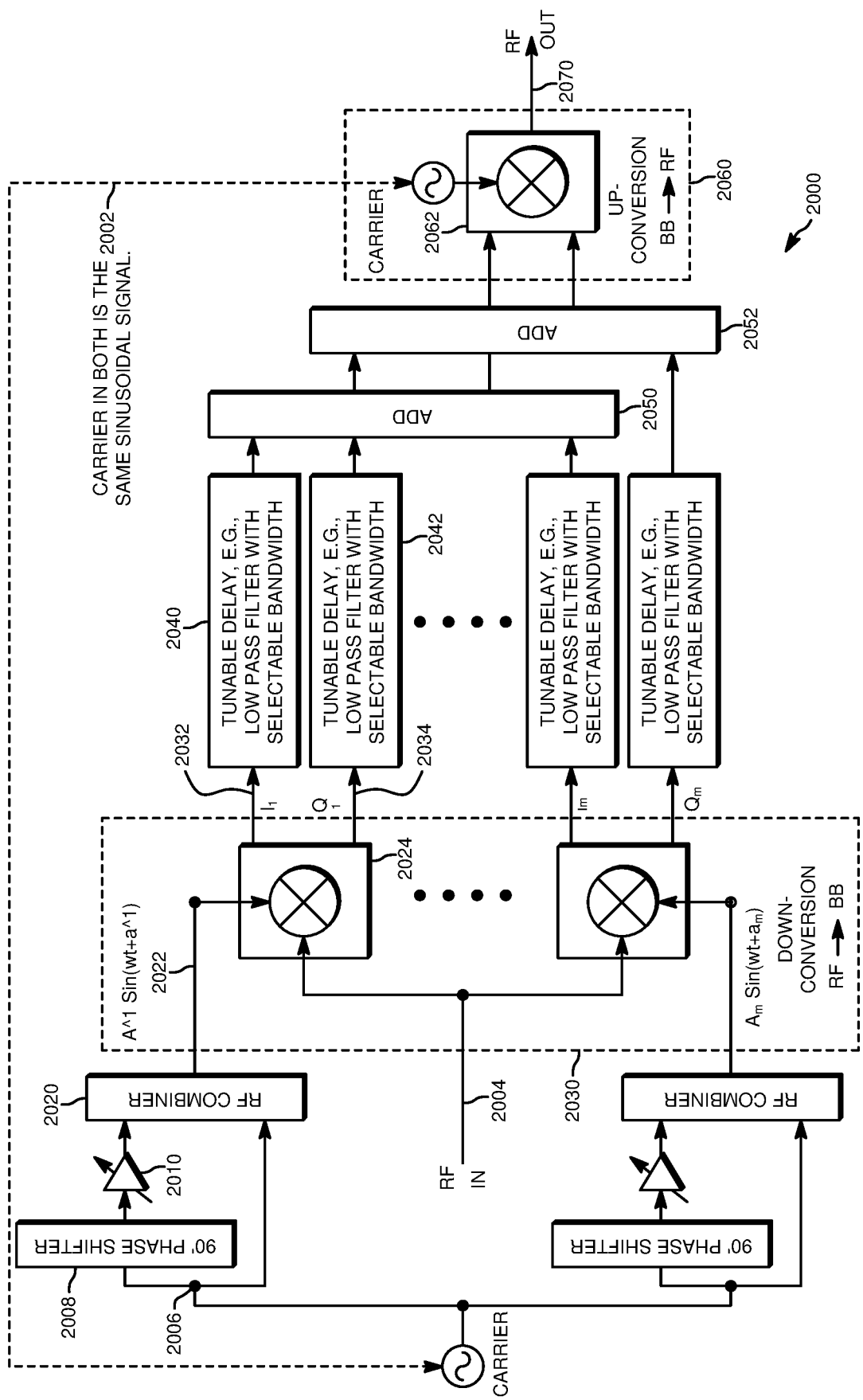
FIG. 20 illustrates a circuit diagram in accordance with one or more embodiments for adjusting phase and magnitude of a carrier signal.
Figure 21:
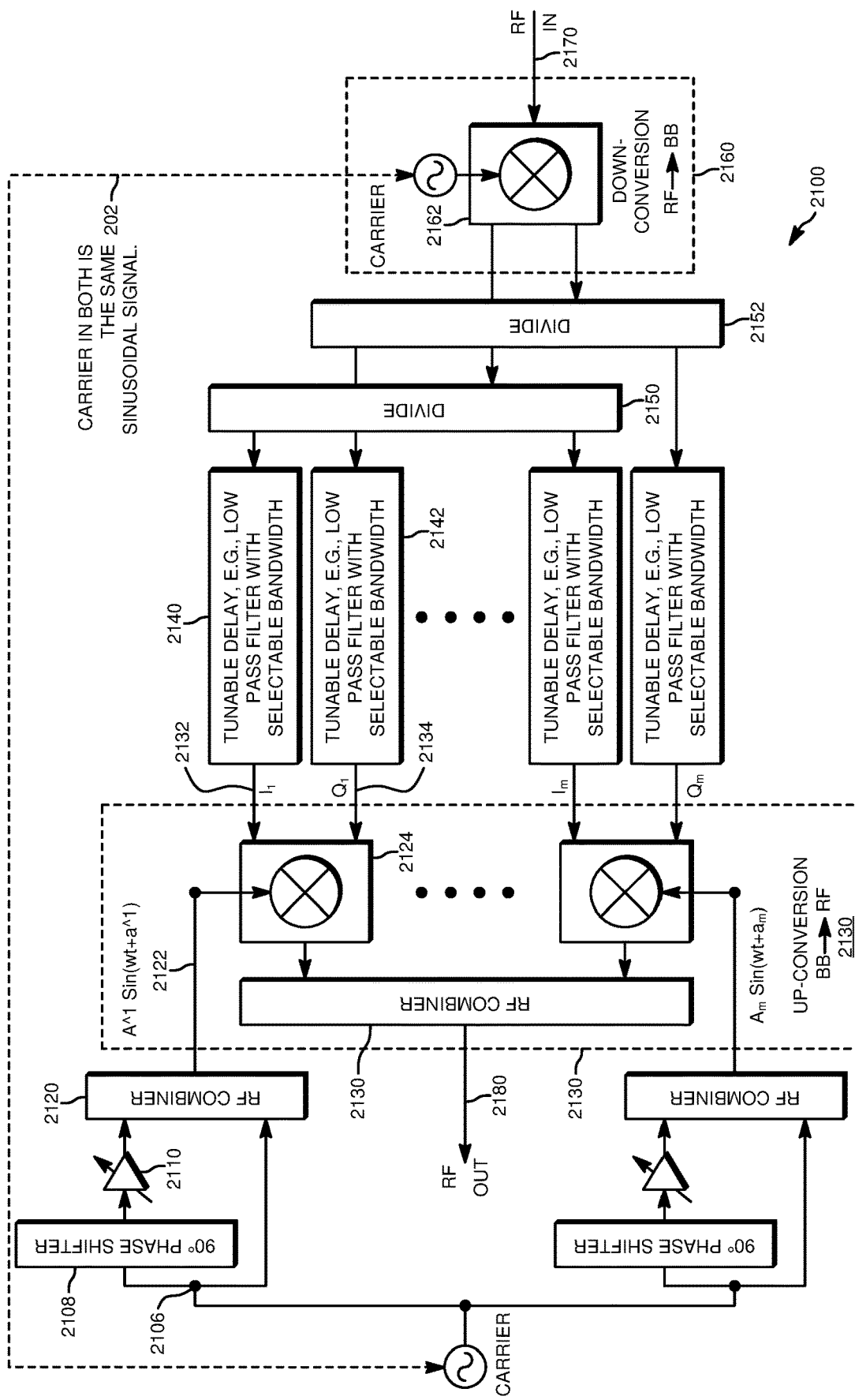
FIG. 21 illustrates a circuit diagram in accordance with one or more embodiments for adjusting phase and magnitude of a carrier signal.

FIGS. 20 and 21 depict pictorial views of embodiments for adjusting phase and magnitude of a carrier signal. Such a carrier can be used, as a low cost option, for the adjustment of the carrier, which is required in implementing complex multiplication through down-conversion (RF→IF, RF→BB) or up-conversion (IF→RF, BB→RF).

FIG. 20 illustrates a block diagram 2000 wherein a circuit of the form shown in FIGS. 18, 19 are used to change the phase/magnitude of a carrier 2002. The resulting sinusoidal signals are used as carriers in several down-conversions of an RF IN signal 2004.

As shown, carrier 2002 is provided at 2006 to 90 degree phase shifter 2008 tunable amplifier 2010 and RF combiner 2020 and then to down-converter 2030 where Aisin(ωt+a$_1$) 2022 and mixer 2024 produce I 2032 and Q 2034 (representing I$_{1-m}$ and Q$_{1-m}$) which are provide to tunable delays 2040 and 2042, which are added at 2050 and 2052, and then provided to upconverter 2060 where carrier 2002 multiplies 2062 to provide an RF output 2070.

Referring to FIG. 21 a block diagram 2100 illustrates a circuit of the form shown in FIGS. 18, 19 are used to change the phase/magnitude of a carrier 2102. The resulting sinusoidal signals are used as carriers in several down-conversions of an RF IN signal 2170.

As shown, carrier 2102 is provided at 2106 to 90 degree phase shifter 2108 tunable amplifier 2110 and RF combiner 2120 and then to up-converter 2130 where Aisin(ωt+a$_1$) 2122 and mixer 2124 receive I 2132 and Q 2134 (representing I$_{1-m}$ and Q$_{1-m}$) which are received from tunable delays 2140 and 2142, from dividers at 2150 and 2152. Divider 2152 receives signals from down converter 2160 where carrier 2102 multiplies 2162 after receiving RF IN 2170. Outputs of up-converter 2130 are provided to RF combiner 2176 and provide RF output 2180.

The changes in the phase/magnitude of each RF carrier plays the role of a complex multiplication in its corresponding filter tap. The resulting BB signal is passed through low-pass filters with tunable bandwidths. This stage is used to tune (change) the values of delay elements in the filtering operation by changing the low-pass filters' bandwidths. FIG. 21 depicts a pictorial view of a preferred embodiment, wherein a circuit of the form shown in FIGS. 18, 19 are used to change the phase/magnitude of a carrier. The resulting sinusoidal signals are used as carriers in several up-conversions of an RF IN signal. The changes in the phase/magnitude of each RF carrier plays the role of a complex multiplication in its corresponding filter tap. The BB signal, which is obtained by first down-converting an RF IN signal, is passed through low-pass filters with tunable bandwidths. This stage is used to tune (change) the values of delay elements in the filtering operation by changing the low-pass filters' bandwidths.

Figure 22:
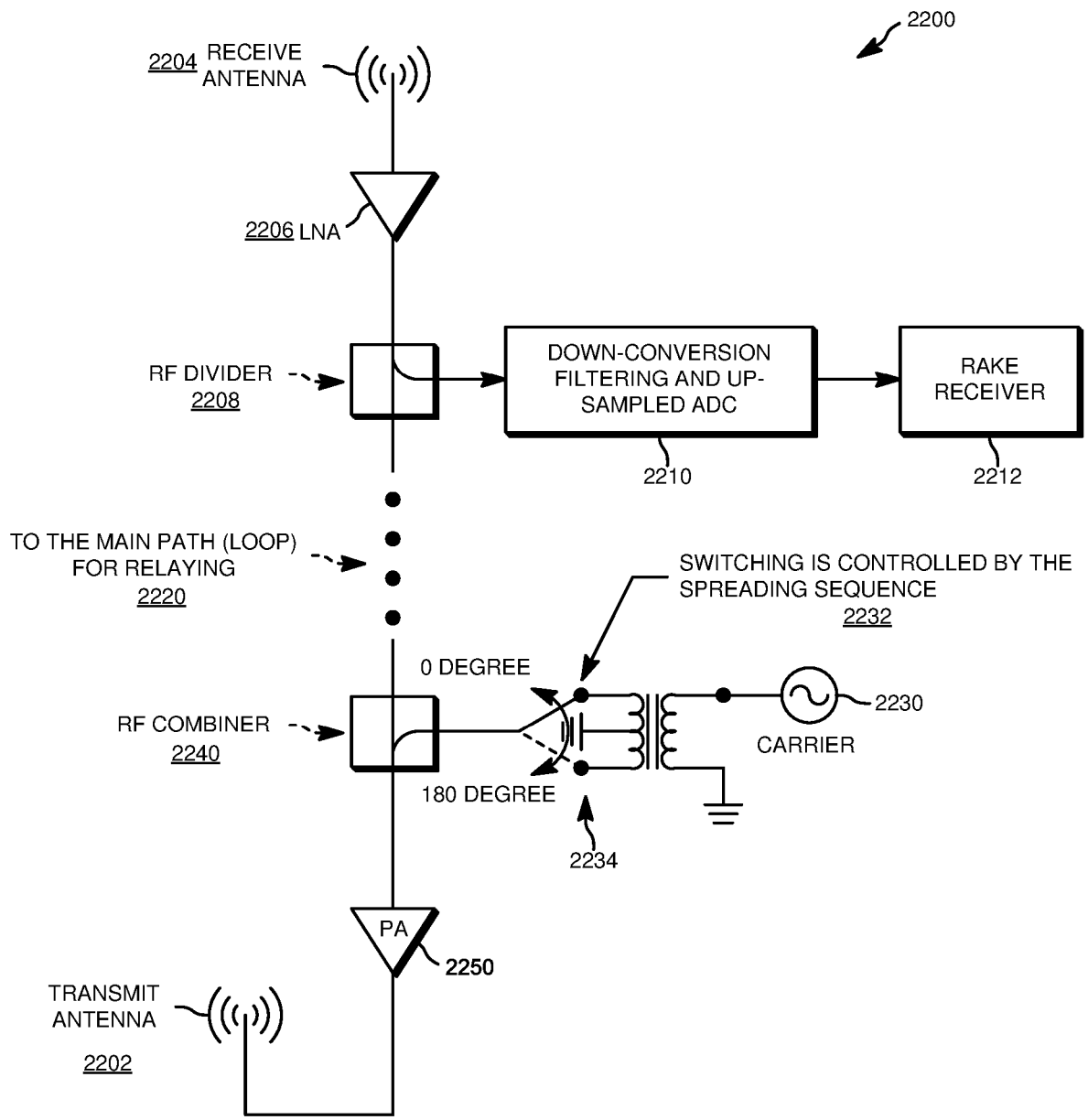
FIG. 22 illustrates a circuit diagram for the use of a RAKE receiver operating in digital baseband in accordance with one or more embodiments.

FIG. 22 depicts the use of a RAKE receiver in a block diagram 2200 operating in digital baseband, while the baseband signal is up-sampled in order to improve the accuracy (time resolution) in estimating the impulse response of the self-interference channel. In particular, relying on up-sampled data helps is improving accuracy in estimating delays (avoids sacrificing the accuracy in discretization). FIG. 22 shows a transmit antenna 2202 and a receive antenna 2204. FIG. 22 shows a low noise amplifier 2206 coupled to an RF divide 2208 shown coupled to down conversion filter and up-sampled ADC block 2210 and RAKE receiver 2212. RF divider 2208 is also shown coupled to a main path (loop) for relaying 2220 that is coupled to an RF combiner 2240 which receives signals from switch 2232. Specifically, RF combiner 2240 is shown coupled to a switching mechanism 2232 controlled by a spreading sequence and carrier 2230. The switch includes 0 degrees and 180 degree 2234. The output of RF combiner 2240 is provided to power amplifier 2250 and to transmit antenna 2202.

Figure 23:
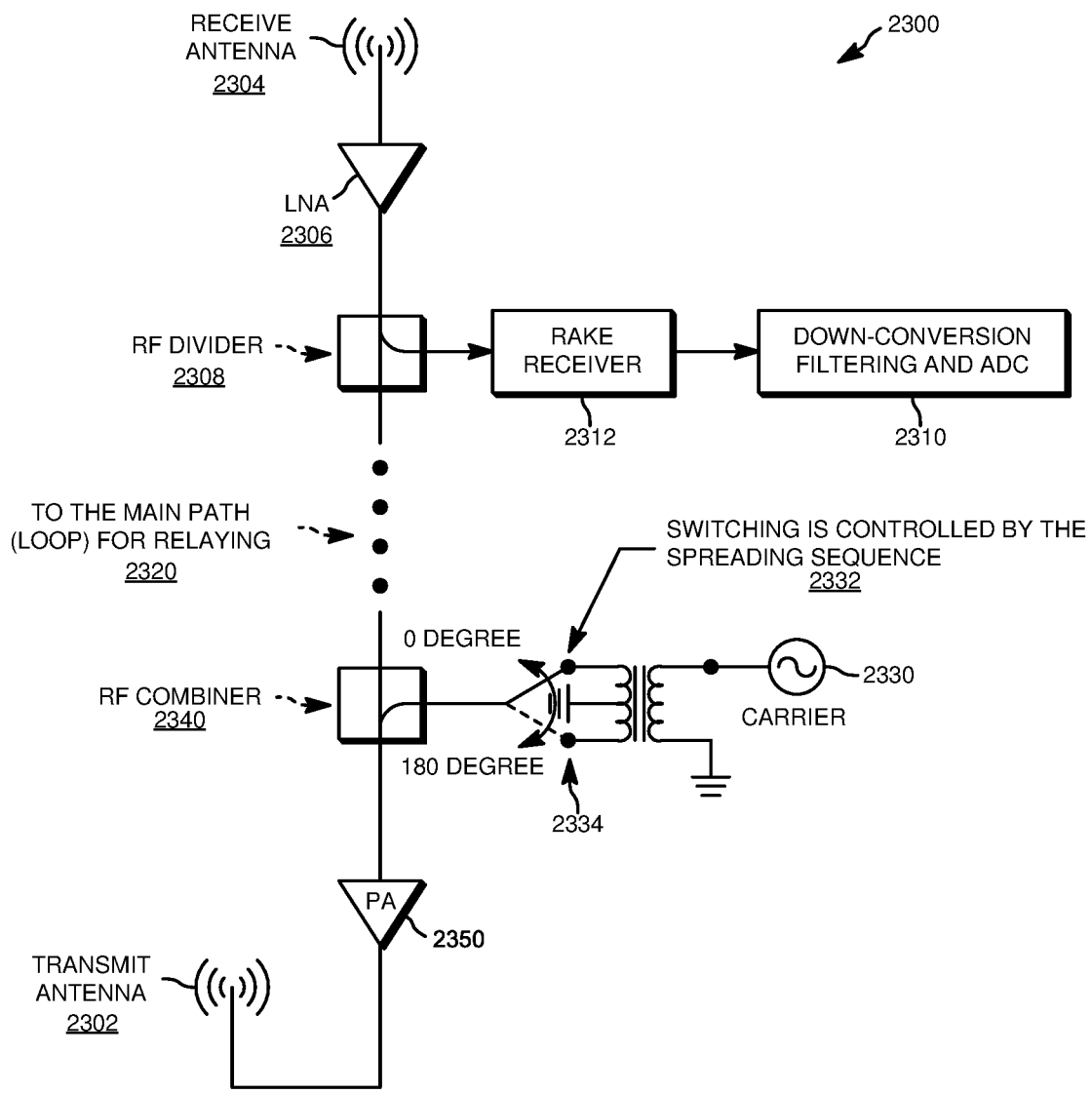
FIG. 23 illustrates a circuit diagram for the use of a RAKE receiver operating in the analog RF domain prior to down-conversion in accordance with one or more embodiments.

FIG. 23 depicts the use of a RAKE receiver at the RF front-end of the receiver unit operating in the analog RF domain prior to down-conversion. More specifically, block diagram 2300 shows a transmit antenna 2302 and a receive antenna 2304. FIG. 23 shows a low noise amplifier 2306 coupled to an RF divider 2308 shown coupled to RAKE receiver 2312 and down conversion filter and up-sampled ADC block 2310. RF divider 2208 is also shown coupled to a main path (loop) for relaying 2320 that is coupled to an RF combiner 2340 which receives signals from switch 2332. Specifically, RF combiner 2340 is shown coupled to a switching mechanism 2332 controlled by a spreading sequence and carrier 2330. The switch includes 0 degrees and 180 degree 2334. The output of RF combiner 2340 is provided to power amplifier 2250 and to transmit antenna 2302.

One or more embodiments are based on placing two sets of antennas on opposite sides of a box. Such a box-shape configuration is typically placed (e.g., near a window) such that one side (say the back side) faces towards a distant transceiver, and the other side (say the front side) faces the opposite direction (e.g., facing towards the interior of a room). In a preferred embodiment, this box-shaped configuration includes a full-duplex (in-band) relay. In one embodiment, such a box-shaped configuration includes an internal compartment which is placed within the external surfaces containing the antennas, and is separated using sides internal to the box. This compartment holds the circuitry required to operate the overall structure, and also helps in isolating the antennas placed on the opposite external surfaces of the box. To minimize the interference to/from the circuitry, such a compartment is typically surrounded by metallic sides, or by sides made of RF absorbers. Another embodiment includes two compartments, one compartment is placed inside the box and a second compartment is located at the bottom of the box. Having access to two isolated compartments enables further isolating the transmit circuitry (placed in one compartment) from the receive circuitry (placed in the other compartment).

Another embodiment relies on a box frame form factor with antenna elements installed inside the box and also on its sides. The antennas interior to the box could be used for receive and antennas on the frame's sides could be for transmit, or vice versa. In some embodiments, the exterior of such a box frame serves a dual purpose. In one such embodiment, the exterior side serves the purpose of a framed picture for decorative purposes. In another embodiment, antenna elements are grouped into antenna panels, and overall receive antenna includes several such antenna panels. Such a dividing of antenna elements into smaller panels reduces the fabrication costs and simplifies transportation and assembly. In one embodiment, there is a compartment behind the antenna panels, typically separated by a metallic wall, holding the circuitries. In another embodiment, there is a smaller wall on the front hiding a lightening assembly that lightens the framed picture (for decorative purposes). In another embodiment, the sides of the box frame are angled to improve isolation between transmit and receive antenna elements. Antennas placed at an angle near the surrounding sides are used for transmission and antennas placed inside the frame are used for receiving. Similar to all other embodiments, the roles of transmit antennas and receive antennas can be swapped. This means, antennas placed at an angle near the surrounding sides can be used for receive and antennas placed inside the box frame can be used for transmit. In another embodiment, the sides are angled outward.

To improve the cancellation of self-interference in the second stage of beamforming, it helps if the effective impulse responses involved in the second stage of beamforming (each impulse response corresponds to the combined, i.e., beam-formed, output of one the groups in the first stage of beamforming) are aligned in time. To improve this feature, at least one embodiment includes cascading the output of each such group with a tunable delay prior to the second stage of beamforming. Tunable delay elements are obtained by: (i) transmission lines of different lengths, and/or (ii) filters of different bandwidths, resulting in different delays, and/or (iii) linear phase filters commonly used to adjust relative delays in signal processing applications. In one embodiment, the tunable delay element is cascaded with a {0',180'} phase shifter, or a complex multiplication using a vector modulator, prior to combining the corresponding signals in the second stage of beamforming.

Signal processing techniques for echo cancellation are widely used in a variety of applications related to sound. There is an important difference in echo cancellation herein, vs. these legacy methods. In one or more embodiments, to avoid an unacceptable delay, the filtering operation needs to be performed on analog signals. This is in contrast to legacy echo cancellation wherein signal processing is performed on digitized signals (in the digital domain). A filtering operation is hereafter explained in terms of Finite Impulse Response (FIR) filters. Generalization to Infinite Impulse Response (IIR) filters, or a combination of FIR and IIR filters is straightforward. The main challenge in realizing such an analog filtering operation is the need for delay elements used in filtering. Ideally, these delay values should be multiple of a base value D, which should be selected to mimic Nyquist sampling in the analog domain. In other words, D should be less than or equal to the delay determined by Nyquist sampling rule. To realize such a set of delay values, one or more embodiments disclose a method based on cascading a bandpass filter multiple times. The bandpass filter is such that its delay value within the signal band is equal to D. This is achieved by using a bandpass filter of bandwidth W greater than or equal to the signal bandwidth. In one embodiment, RF SAW filters are used to realize the required delay. The bandwidth of the SAW filters is equal to or larger than the bandwidth of the signals. In one embodiment, the bandwidth of the SAW filers is an integer multiple of the signal bandwidth, in order to mimic up-sampling used in the digital domain. In addition to filtering operation for the purpose of echo cancellation, embodiments include Automatic Gain Control (AGC) to control the overall gain of the loop and thereby avoid oscillation.

In some embodiments, the adjustment of coefficients of echo cancelling filter is achieved using blind techniques (without using a training signal). In some other embodiments, the inclusion (superimposing) of training spreading signals and its extraction for learning of the channel impulse response is performed periodically (or as needed, for example when the level of self-interference exceeds a threshold), followed by blind adaptation of filter structures in-between such training phases. In some embodiments, the addition of training signal and readjustment of filter coefficients is performed when the level of self-interference exceeds certain threshold, and/or the AGC ends up in reducing the overall gain below a certain threshold.

RAKE Receivers

A RAKE receiver is a known method for improving signal-to-noise ratio in signaling over multipath fading channels. A RAKE is composed of several correlators, called fingers, each assigned to a different multipath component. FIG. 7 depicts an embodiment wherein a correlator receiver analogous to RAKE receiver is implemented at the RF front. In methods according to one or more embodiments, it is useful to improve the effective signal-to-noise ratio in extracting the impulse response of the self-interference channel, while keeping the power of the transmitted training signal as low as possible to avoid causing interference. In particular, it is useful to have an accurate estimation of the associated delay profile, i.e., delays associated with different paths constructing the self-interference channel. In addition, it is desirable to be able to accurately estimate the delay values as continuous quantities. Methods herein rely on three complementary techniques to realize these goals:

(1) Using pre-equalization of the self-interference channel. FIG. 8 depicts an embodiment analogous to time reversal filtering wherein the impulse response of the self-interference channel is effectively pre-equalized in order to improve the signal-to-noise ratio in extracting the impulse response at the receiver side.

(2) Using a RAKE receiver operating in digital baseband, while relying on up-sampling to improve the accuracy in estimating the exact delay values (FIG. 22).

(3) Using a RAKE receiver at the RF front-end of the receiver unit operating in the analog RF domain prior to down-conversion (FIG. 23).

Time Reversal Signal Processing is a technique for focusing signals. A Time Reversal Mirror (TRM) is an algorithm that focuses signals using the time reversal method. Functionality of a TRM is very similar to pre-equalization. For this reason, in the description herein, the terminologies TRM and pre-equalization are used interchangeably. FIG. 8 depicts an embodiment wherein TRM is used to focus the energy in the impulse response of the self-interference channel and thereby improve the signal-to-noise ratio in extracting the impulse response. In one or more embodiments, RAKE receiver structures depicted in FIG. 7, FIG. 22 and FIG. 23 are used in combination with the TRM method of FIG. 8.

Methods herein include the use of metallic closures (in the form of boxes with at least one of their sides being opened) for separating transmit and receive antennas.

Methods herein include adjusting relative placement (in three dimensions), relative orientation and relative rotation of antennas with respect to each other to reduce the coupling between transmit and receive chains.

Methods herein include adjusting relative shapes of antennas, e.g., shapes of the dipoles' arms and shapes of the patch top metal part and ground plane, with respect to each other to reduce the coupling between transmit and receive chains.

In the specification, specific embodiments have been described. However, one of ordinary skill in the art appreciates that various modifications and changes can be made without departing from the scope of embodiments as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. Embodiment are defined solely by the appended claims including any amendments made during the pendency of this application and all equivalents of those claims as issued.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

What is claimed is:

1. A method for amplify-and-forward relaying comprising:
    performing antenna beamforming to identify beamformer settings that provide an increased signal to noise ratio of a desired signal and also provide a self-interference channel at a level that avoids oscillation in a receive signal path, wherein performing the antenna beamforming comprises:
        organizing a plurality of antenna elements into a plurality of groups;
        performing beamforming in a first stage, wherein the plurality of antenna elements within each of the plurality of groups are beamformed using at least a two-state beam-former configured to generate at least a phase shift of either zero degrees or a phase shift of 180 degrees; and
        performing beamforming in a second stage, wherein a plurality of signals from the plurality of groups are beamformed using a plurality of adaptive analog filters; and
    reducing self-interference using an adaptive echo cancellation circuit in at least one tunable relay element, wherein the adaptive echo cancellation circuit is configured in accordance with a measured self-interference channel resulting in part from the performed antenna beamforming.

2. The method of amplify-and-forward relaying of claim 1, wherein performing the beamforming in the first stage includes beamforming using a three-state beam-former configured to generate the phase shift of zero degrees, the phase shift of 180 degrees, or a disconnect for each antenna element.

3. The method of amplify-and-forward relaying of claim 1, wherein:
    the plurality of adaptive analog filters comprises a plurality of bandpass filters in a radio frequency or intermediate frequency domain, coupled to one or more low-pass filters in an analog baseband; and
    at least one of a plurality of bandwidths of the plurality of filters is adjusted to produce a plurality of tunable delay elements.

4. The method for amplify-and-forward relaying of claim 1, further comprising:
    extracting an impulse response of the self-interference channel using a training signal that is directly added at a radio frequency front end by switching a carrier signal;
    adding the training signal and one or more delayed versions of the training signal corresponding to one or more signal paths of the self-interference channel;
    extracting the training signal at a receiver side of the tunable relay element by applying down-conversion and baseband processing;
    up-sampling the down-converted training signal to increase time resolution in extracting one or more delay values corresponding to the one or more signal paths in the self-interference channel; and
    applying a RAKE receiver at baseband to detect the impulse response of the self-interference channel with a high time resolution.

5. A method for amplify-and-forward relaying comprising:
    performing antenna beamforming to identify beamformer settings that provide an increased signal to noise ratio of a desired signal and also provide a self-interference channel at a level that avoids oscillation in a receive signal path;
    reducing self-interference using an adaptive echo cancellation circuit in at least one tunable relay element, wherein the adaptive echo cancellation circuit is configured in accordance with a measured self-interference channel resulting in part from the performed antenna beamforming;
    adding a low power spreading training signal to an outgoing relayed signal;
    extracting the added low power spreading training signal at a receiver side of the at least one tunable relay element; and
    computing a plurality of beamforming values using the added low power spreading training signal.

6. The method for amplify-and-forward relaying of claim 5, wherein the low power spreading training signal is generated by switching a radio frequency carrier, wherein the low power spreading training signal is directly added at a radio frequency front-end transmitter, and wherein the low power spreading training signal is extracted via a correlator receiver at a radio frequency front-end receiver.

7. The method for amplify-and-forward relaying of claim 5, wherein performing the antenna beamforming comprises:
    training a first set of beam-forming circuitries while using a second set of beam-forming circuitries; and
    switching between the first set and the second set of beam-forming circuitries at predetermined times that do not disturb equalization of signals communicated to and from a distant transceiver.

8. The method for amplify-and-forward relaying of claim 5, wherein the low power spreading training signal comprises a plurality of copies of a spreading signal used for training, each of the plurality of copies of the spreading signal being mutually delayed and weighted.

9. The method for amplify-and-forward relaying of claim 5, wherein the low power spreading training signal is used to determine an impulse response of the self-interference channel when the low power spreading training signal is added to a radio frequency signal by switching a carrier signal.

10. The method for amplify-and-forward relaying of claim 5, wherein the low power spreading training signal is directly added at a radio frequency transmit front-end by switching a carrier signal, and wherein an impulse response of the self-interference channel is extracted using a RAKE receiver operating in an analog radio frequency receive front-end prior to a down-conversion to baseband.

11. A method for amplify-and-forward relaying comprising:
  performing antenna beamforming to identify beamformer settings that provide an increased signal to noise ratio of a desired signal and also provide a self-interference channel at a level that avoids oscillation in a receive signal path;
  reducing self-interference using an adaptive echo cancellation circuit in at least one tunable relay element, wherein the adaptive echo cancellation circuit is configured in accordance with a measured self-interference channel resulting in part from the performed antenna beamforming;
  extracting an impulse response of the self-interference channel using a training signal that includes a plurality of copies of a spreading signal used in training, each of the plurality of copies of the spreading signal being mutually delayed and weighted to enable a composite training signal that pre-equalizes the self-interference channel based on time-reversal filtering.

12. A method for amplify-and-forward relaying comprising:
  performing antenna beamforming to identify beamformer settings that provide an increased signal to noise ratio of a desired signal and also provide a self-interference channel at a level that avoids oscillation in a receive signal path; and
  reducing self-interference using an adaptive echo cancellation circuit in at least one tunable relay element, wherein the adaptive echo cancellation circuit is configured in accordance with a measured self-interference channel resulting in part from the performed antenna beamforming, and wherein the echo cancellation circuit has three different stages of echo cancellation:
  wherein a first stage of echo cancellation at a radio frequency includes one or more first stage delay elements for adaptive filtering, and wherein the one or more first stage delay elements include a plurality of radio frequency bandpass filters coupled to a first plurality of vector modulators configured to perform complex multiplication;
  wherein a second stage of echo cancellation at an intermediate frequency includes one or more second stage delay elements for the adaptive filtering, and wherein the one or more second stage delay elements comprise a plurality of bandpass filters coupled to a second plurality of vector modulators configured to perform complex multiplication; and
  wherein a third stage of echo cancellation at an analog baseband includes one or more third stage delay elements that comprise a plurality of low-pass filters with selectable bandwidths, and wherein complex multiplications are performed by changing a phase and a magnitude of a radio frequency (RF) carrier used in down conversion to baseband.

13. A method for amplify-and-forward relaying comprising:
  performing antenna beamforming to identify beamformer settings that provide an increased signal to noise ratio of a desired signal and also provide a self-interference channel at a level that avoids oscillation in a receive signal path; and
  reducing self-interference using an adaptive echo cancellation circuit in at least one tunable relay element, wherein the adaptive echo cancellation circuit is configured in accordance with a measured self-interference channel resulting in part from the performed antenna beamforming, and wherein the echo cancellation circuit has three different stages of echo cancellation:
  wherein a first stage of echo cancellation at a radio frequency includes one or more first stage delay elements for adaptive filtering, and wherein the one or more first stage delay elements comprise a plurality of radio frequency bandpass filters and a first plurality of vector modulators configured to perform complex multiplication;
  wherein a second stage of echo cancellation at an intermediate frequency includes one or more second stage delay elements for the adaptive filtering, and wherein the one or more second stage delay elements comprise a plurality of bandpass filters and a second plurality of vector modulators configured to perform complex multiplication; and
  wherein a third stage of echo cancellation at an analog baseband includes one or more third stage delay elements comprising a plurality of low-pass filters with selectable bandwidths, and wherein an adjustment of relative magnitudes and signs of a plurality of in-phase and quadrature components (I and Q) at the analog baseband provide complex multiplications.

14. A method for amplify-and-forward relaying comprising:
  performing antenna beamforming to identify beamformer settings that provide an increased signal to noise ratio of a desired signal and also provide a self-interference channel at a level that avoids oscillation in a receive signal path; and
  reducing self-interference using an adaptive echo cancellation circuit in at least one tunable relay element, wherein the adaptive echo cancellation circuit is configured in accordance with a measured self-interference channel resulting in part from the performed antenna beamforming, and wherein the echo cancellation circuit has three different stages of echo cancellation:
  wherein a first stage of echo cancellation at a radio frequency includes one or more first stage delay elements for adaptive filtering, and wherein the one or more first stage delay elements comprise a plurality of radio frequency bandpass filters and a first plurality of vector modulators configured to perform complex multiplication; and
  wherein a second stage of echo cancellation is performed at an intermediate frequency; and
  wherein a third stage of echo cancellation at an analog baseband includes one or more third stage delay elements comprising a plurality of low-pass filters with selectable bandwidths, and wherein complex multiplications are performed by changing a phase of a radio frequency carrier used in down-conversion to baseband with gain adjustments at the analog baseband.

15. A system comprising:
  a processor and a non-transitory computer-readable medium storing processor-executable instructions operative to cause:

performing antenna beamforming to identify beam-former settings that provide an increased signal to noise ratio of a desired signal and also provide a self-interference channel at a level that avoids oscillation in a receive signal path; and reducing self-interference using an adaptive echo cancellation circuit in at least one tunable relay element, wherein the adaptive echo cancellation circuit is configured in accordance with a measured self-interference channel resulting in part from the performed antenna beamforming, and wherein the echo cancellation circuit has three different stages of echo cancellation including:

a first stage of echo cancellation at a radio frequency;

a second stage of echo cancellation at an intermediate frequency;

a third stage of echo cancellation at an analog baseband;

a plurality of antenna elements organized into a plurality of groups, and wherein to cause performing the antenna beamforming, the instructions are further operative to cause:

in a first stage, beamforming the plurality of antenna elements within each of the plurality of groups using a two-state beam-former configured to generate at least a phase shift of either zero degrees or a phase shift of 180 degrees; and in a second stage, beamforming a plurality of signals from the plurality of groups using a plurality of adaptive analog filters.

16. The system of claim 15, wherein to cause performing the antenna beamforming, the instructions are further operative to cause, in the first stage, beamforming the plurality of antenna elements within each of the plurality of groups includes using a third state in the beam-former configured to selectively disconnect each antenna element.

* * * * *